US011457439B2

United States Patent
Kim et al.

(10) Patent No.: US 11,457,439 B2
(45) Date of Patent: Sep. 27, 2022

(54) METHOD AND DEVICE FOR EXECUTING COMMUNICATION VIA UPLINK ACCESS IN WIRELESS LAN SYSTEM

(71) Applicant: LG ELECTRONICS INC., Seoul (KR)

(72) Inventors: Jeongki Kim, Seoul (KR); Kiseon Ryu, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 17/049,189

(22) PCT Filed: Apr. 22, 2019

(86) PCT No.: PCT/KR2019/004811
§ 371 (c)(1),
(2) Date: Oct. 20, 2020

(87) PCT Pub. No.: WO2019/203626
PCT Pub. Date: Oct. 24, 2019

(65) Prior Publication Data
US 2021/0243756 A1    Aug. 5, 2021

Related U.S. Application Data

(60) Provisional application No. 62/666,646, filed on May 3, 2018.

(30) Foreign Application Priority Data

Apr. 20, 2018  (KR) .................. 10-2018-0045970
Apr. 30, 2018  (KR) .................. 10-2018-0049839
Apr. 30, 2018  (KR) .................. 10-2018-0049948

(51) Int. Cl.
*H04W 72/04* (2009.01)
*H04W 52/36* (2009.01)
(Continued)

(52) U.S. Cl.
CPC ..... *H04W 72/0426* (2013.01); *H04W 52/365* (2013.01); *H04W 72/02* (2013.01);
(Continued)

(58) Field of Classification Search
CPC . H04W 28/02; H04W 52/245; H04W 52/365; H04W 74/02; H04W 74/0816;
(Continued)

(56) References Cited

U.S. PATENT DOCUMENTS

2008/0069040 A1   3/2008  An
2016/0192377 A1*  6/2016  Zhou ................ H04W 74/0816
                                                       370/329
2020/0367210 A1* 11/2020  Yang .................. H04W 72/005

FOREIGN PATENT DOCUMENTS

KR    20120139788   12/2012
WO    2014/030983    2/2014
WO    2015/020377    2/2015

OTHER PUBLICATIONS

Wilus, "Clarification on applying MU EDCA parameter set," IEEE 802.11-16/1425r1, Nov. 9, 2016, 8 pages.
(Continued)

*Primary Examiner* — Jianye Wu
(74) *Attorney, Agent, or Firm* — Lee Hong Degerman Kang Waimey

(57) ABSTRACT

The present specification relates to a method and a device for determination related to enhanced distributed channel access (EDCA). For example, it may be inappropriate for a STA to perform uplink communication based on EDCA. In this case, an AP and/or the STA can disable an EDCA function
(Continued)

or operation. The present specification proposes various examples of a determination criterion and a determination method related to EDCA disabling.

6 Claims, 25 Drawing Sheets

(51) Int. Cl.
*H04W 72/02* (2009.01)
*H04W 74/08* (2009.01)
*H04W 80/02* (2009.01)
*H04W 84/12* (2009.01)

(52) U.S. Cl.
CPC ....... *H04W 74/0841* (2013.01); *H04W 80/02* (2013.01); *H04W 84/12* (2013.01)

(58) Field of Classification Search
CPC . H04W 74/0841; H04W 80/02; H04W 72/02; H04W 72/0426; H04W 84/12
See application file for complete search history.

(56) References Cited

OTHER PUBLICATIONS

Laurent Cariou, "CR for MU EDCA parameters," IEEE 802.11-18/1496r1, Sep. 6, 2018; 7 pages.

* cited by examiner

FIG. 1
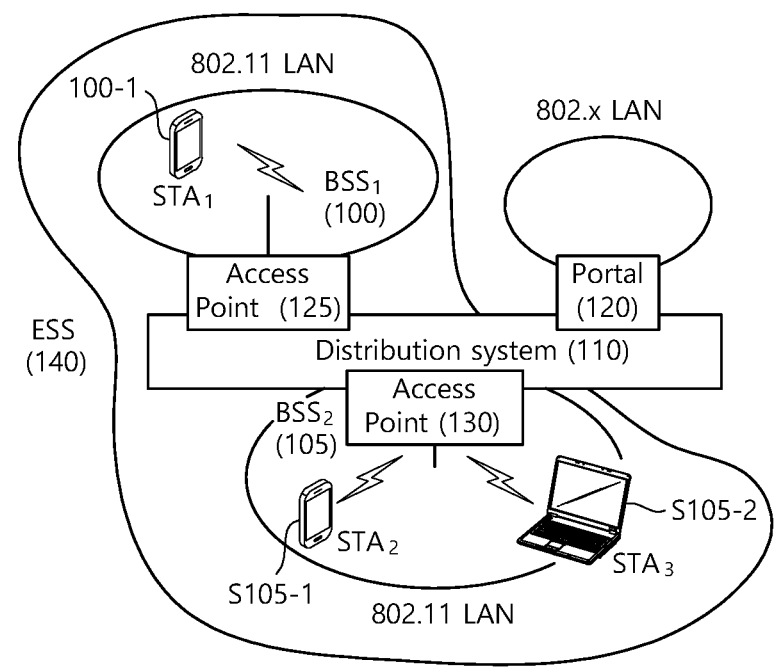
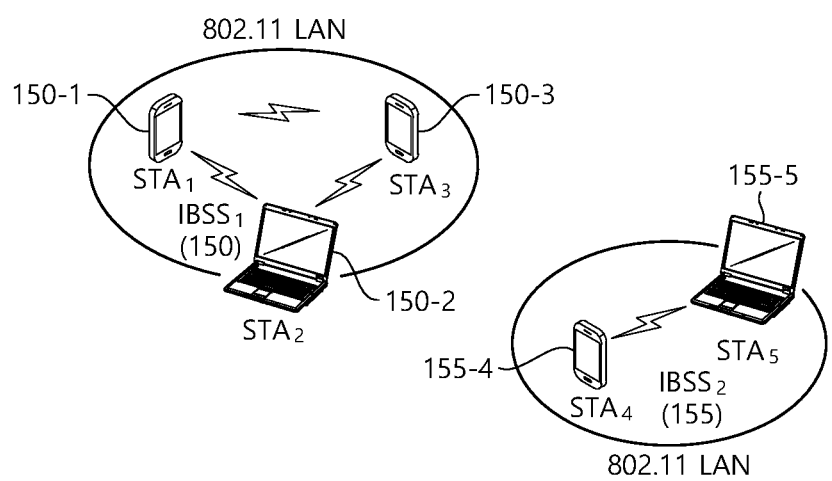

FIG. 17

| Rx NSS | Channel Width | UL MU Disable | Tx NSTS | ER SU Disable | EDCA Access Disable | Reserved |
|---|---|---|---|---|---|---|
| 3 | 2 | 1 | 3 | 1 | 1 | 1 |

FIG. 20

| B26 | B30 | B31 |
|---|---|---|
| Number Of RA-RU | | More RA-RU |

Bits:  5  1

FIG. 21

| B26 | B27 | B30 | B31 |
|---|---|---|---|
| Restricted RA RU | Number of RA-RU | | No More RA-RU |
| 1 | 4 | | 1 |

FIG. 23

| Legacy Part (2310) | EHT SIG Part (2320) | EHT STF Part (2330) | EHT LTF Part (2340) | Data (2350) |

METHOD AND DEVICE FOR EXECUTING COMMUNICATION VIA UPLINK ACCESS IN WIRELESS LAN SYSTEM

CROSS-REFERENCE TO RELATED APPLICATIONS

This application is the National Stage filing under 35 U.S.C. 371 of International Application No. PCT/KR2019/004811, filed on Apr. 22, 2019, which claims the benefit of earlier filing date and right of priority to Korean Application Nos. 10-2018-0045970, filed on Apr. 20, 2018, 10-2018-0049839, filed on Apr. 30, 2018, and 10-2018-0049948, filed on Apr. 30, 2018, and also claims the benefit of U.S. Provisional Application No. 62/666,646, filed on May 3, 2018, the contents of which are all hereby incorporated by reference herein in their entirety.

BACKGROUND

Technical Field

The present specification relates to a technique for transmitting and receiving data in wireless communication and, more particularly, to a method and a device for performing communication through uplink access in a wireless local area network (WLAN) system.

Related Art

A wireless local area network (WLAN) has been improved in various ways. For example, IEEE 802.11ax proposes an improved communication environment using orthogonal frequency division multiple access (OFDMA) and downlink multi-user multiple-input multiple-output (DL MU MIMO) techniques.

This specification improves the existing IEEE 802.11ax standard or proposes technical features that can be used in a new communication standard. The new communication standard may be an extremely high throughput (EHT) standard that is under discussion in recent times. The EHT standard may employ a newly proposed increased bandwidth, an improved PPDU structure, an improved sequence, and a hybrid automatic repeat request (HARQ) technique.

SUMMARY

The present specification proposes a technique for controlling uplink communication in a wireless local area network (WLAN) system. In some cases, it may be difficult for a station (STA) to perform contention-based uplink communication. An example of contention-based uplink communication may be uplink communication based on enhanced distributed channel access (EDCA). For example, when the STA is positioned at the edge of a basic service set (BSS), it may be difficult for the STA to perform contention-based uplink transmission due to a lack of transmission power.

To solve this problem, the present specification proposes an improved method for controlling contention-based uplink communication.

An example of the present specification relates to a method and/or a device for a wireless local area network (WLAN) system.

For example, a station (STA) may receive first control information related to an enhanced distributed channel access (EDCA)-disabling operation of the STA from an access point (AP). For example, the first control information may include at least one parameter related to an EDCA-disabling condition for the STA.

The STA may determine whether to disable an EDCA operation of the STA based on the first control information. Determining to disable the EDCA operation may be performed by the STA and may also be performed by the AP.

When necessary, the STA may transmit second control information related to the determination to the AP.

An example of the present specification provides an effect of controlling contention-based uplink communication. For example, the example of the present specification proposes a function of disabling/blocking contention-based uplink access. Accordingly, a STA performs uplink communication according to an uplink multi-user (UL MU) scheme based on a trigger frame. As a result, the STA can normally perform uplink communication even though having difficulty in contention-based access.

BRIEF DESCRIPTION OF THE DRAWINGS

FIG. 1 is a conceptual view illustrating the structure of a wireless local area network (WLAN).

FIG. 17 illustrates an example of an OM control field.

FIG. 20 illustrates an example of additional information included in a user info field of a trigger frame.

FIG. 21 illustrates an example of control information according to an example of the present specification.

FIG. 23 illustrates an example of a PPDU to which an example of the present specification is applied.

DESCRIPTION OF EXEMPLARY EMBODIMENTS

Figure 2:
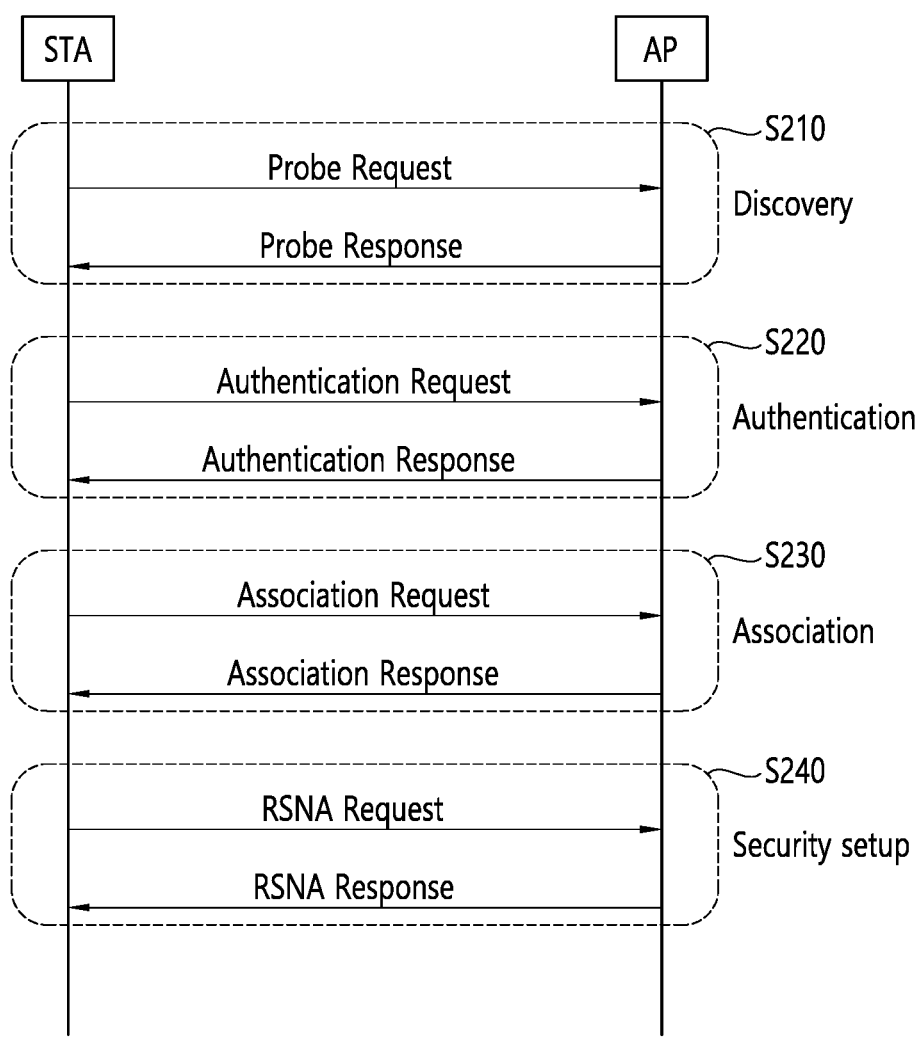
FIG. 2 illustrates a general link setup process.

As used herein, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

As used herein, parentheses may indicate "for example". Specifically, "control information (EHT-SIG)" may mean that "EHT-SIG" is proposed as an example of "control information". Further, "control information (i.e., EHT-SIG)" may also mean that "EHT-SIG" is proposed as an example of "control information".

The following examples of the present specification may be applied to various wireless communication systems. For example, the following examples of the present specification may be applied to a wireless local area network (WLAN) system. For example, the present specification may be applied to IEEE 802.11a/g/n/ac or IEEE 802.11ax. The present specification may also be applied to a newly proposed EHT standard or IEEE 802.11be.

Hereinafter, technical features of a WLAN system to which the present specification is applicable are described in order to describe technical features of the present specification.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

FIG. 2 illustrates a general link setup process.

In S210, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 2 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 2, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S220. The authentication process may be referred to as a first authentication process to be clearly distinguished from the following security setup operation in S240. The authentication process in S220 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S230. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S240, the STA may perform a security setup process. The security setup process in S240 may include a process of setting up a private key through four-way handshaking, for example, through an extensible authentication protocol over LAN (EAPOL) frame.

Figure 3:
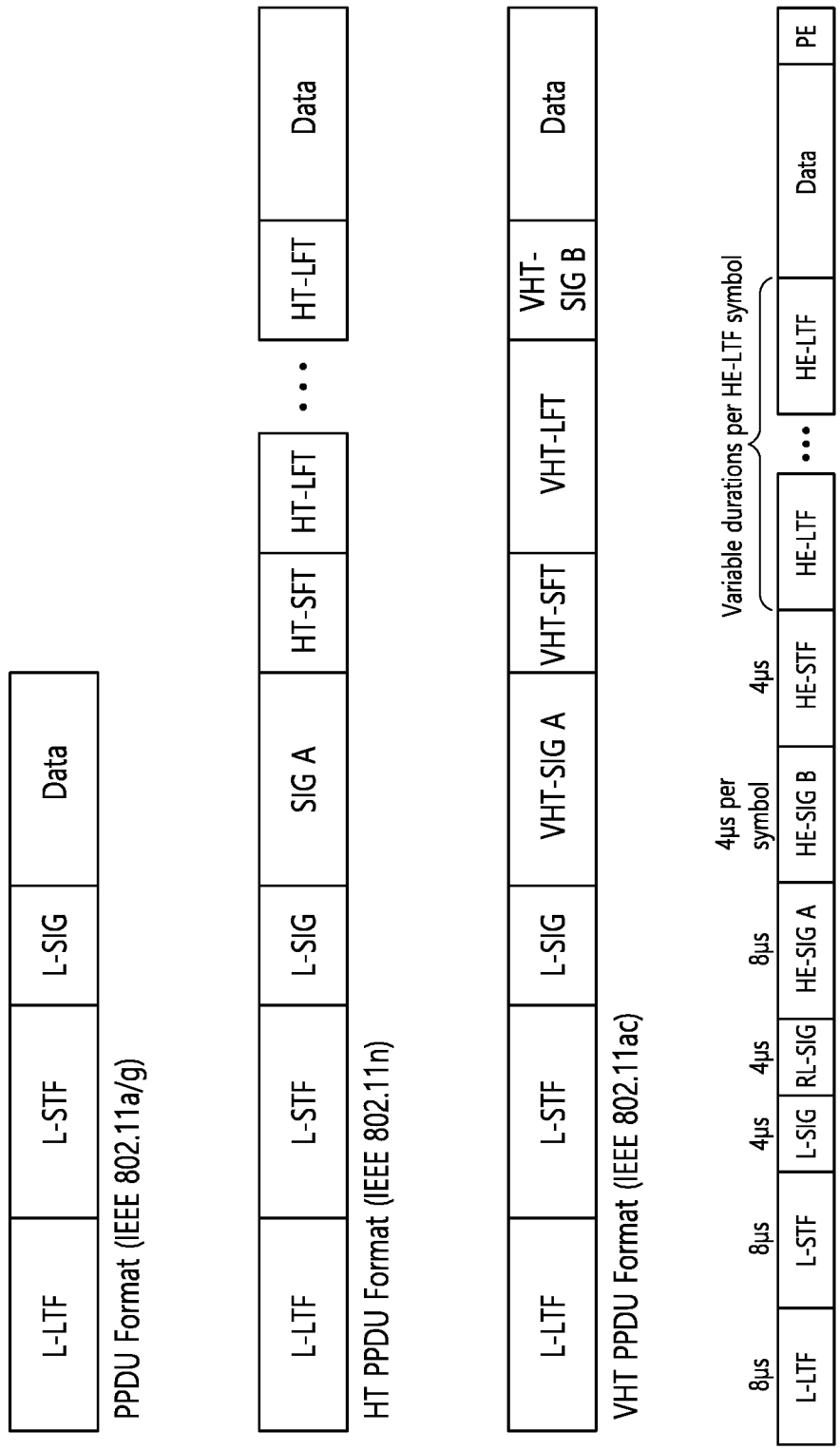
FIG. 3 illustrates an example of a PPDU used in an IEEE standard.

FIG. 3 illustrates an example of a PPDU used in an IEEE standard.

As illustrated in FIG. 3, various types of PHY protocol data units (PPDUs) are used in IEEE a/g/n/ac standards. Specifically, a LTF and a STF include a training signal, a SIG-A and a SIG-B include control information for a receiving STA, and a data field includes user data corresponding to a PSDU (MAC PDU/aggregated MAC PDU).

FIG. 3 also includes an example of an HE PPDU according to IEEE 802.11ax. The HE PPDU according to FIG. 3 is an illustrative PPDU for multiple users. An HE-SIG-B may be included only in a PPDU for multiple users, and an HE-SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 4:
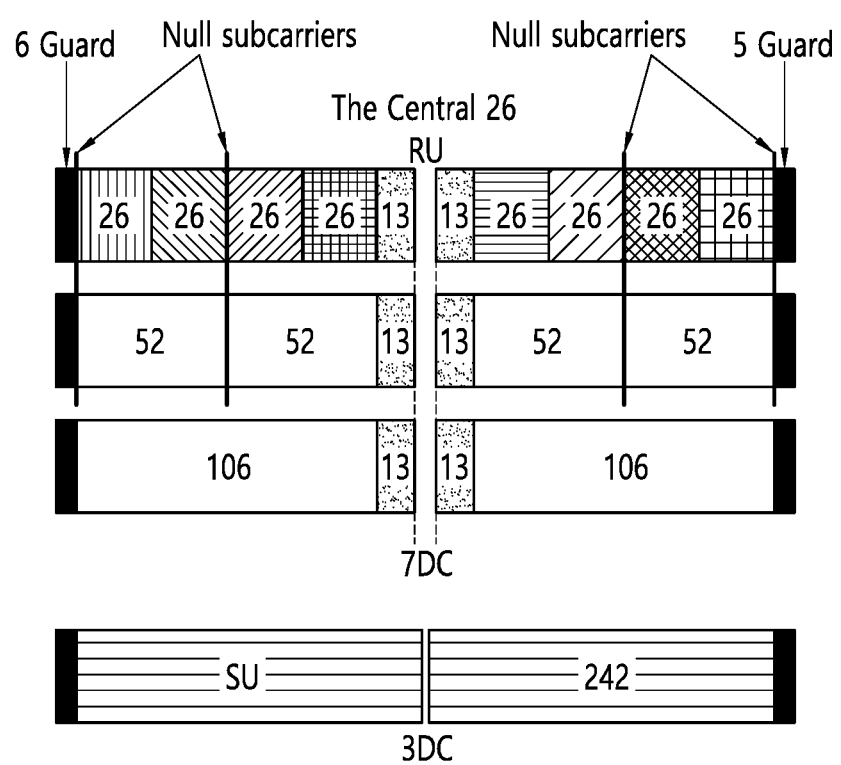
FIG. 4 illustrates a layout of resource units (RUs) used in a band of 20 MHz.

FIG. 4 illustrates a layout of resource units (RUs) used in a band of 20 MHz.

As illustrated in FIG. 4, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 4, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 4 may be used not only for a multiple users (MUs) but also for a single user (SU), in which case one 242-unit may be used and three DC tones may be inserted as illustrated in the lowermost part of FIG. 4.

Although FIG. 4 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 5:
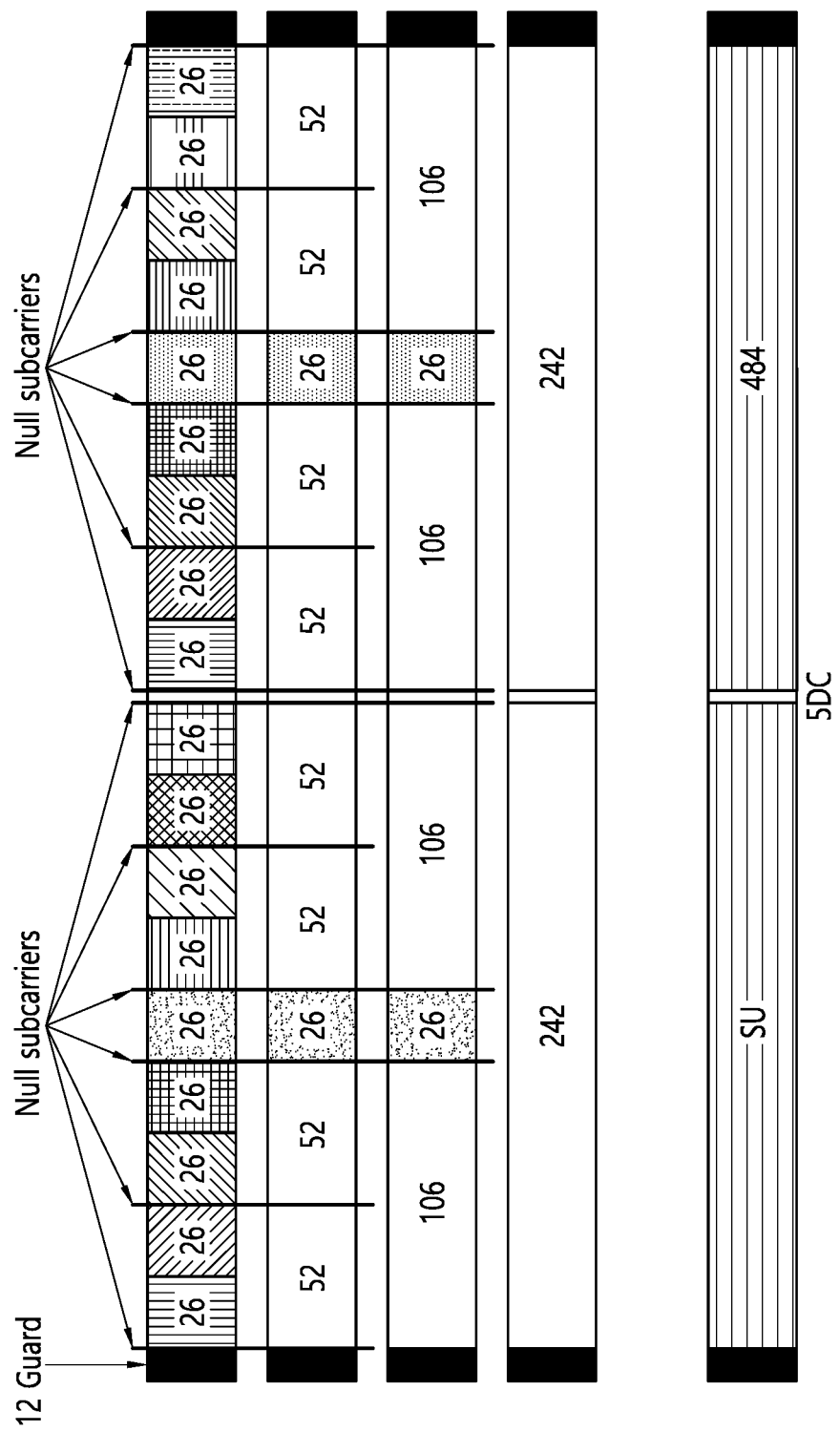
FIG. 5 illustrates a layout of RUs used in a band of 40 MHz.

FIG. 5 illustrates a layout of RUs used in a band of 40 MHz.

Similarly to FIG. 4 in which RUs having various sizes are used, a 26-RU, a 52-RU, a 106-RU, a 242-RU, a 484-RU, and the like may be used in an example of FIG. 5. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 5, when the layout of the RUs is used for a single user, a 484-RU may be used. The specific number of RUs may be changed similarly to FIG. 4.

Figure 6:
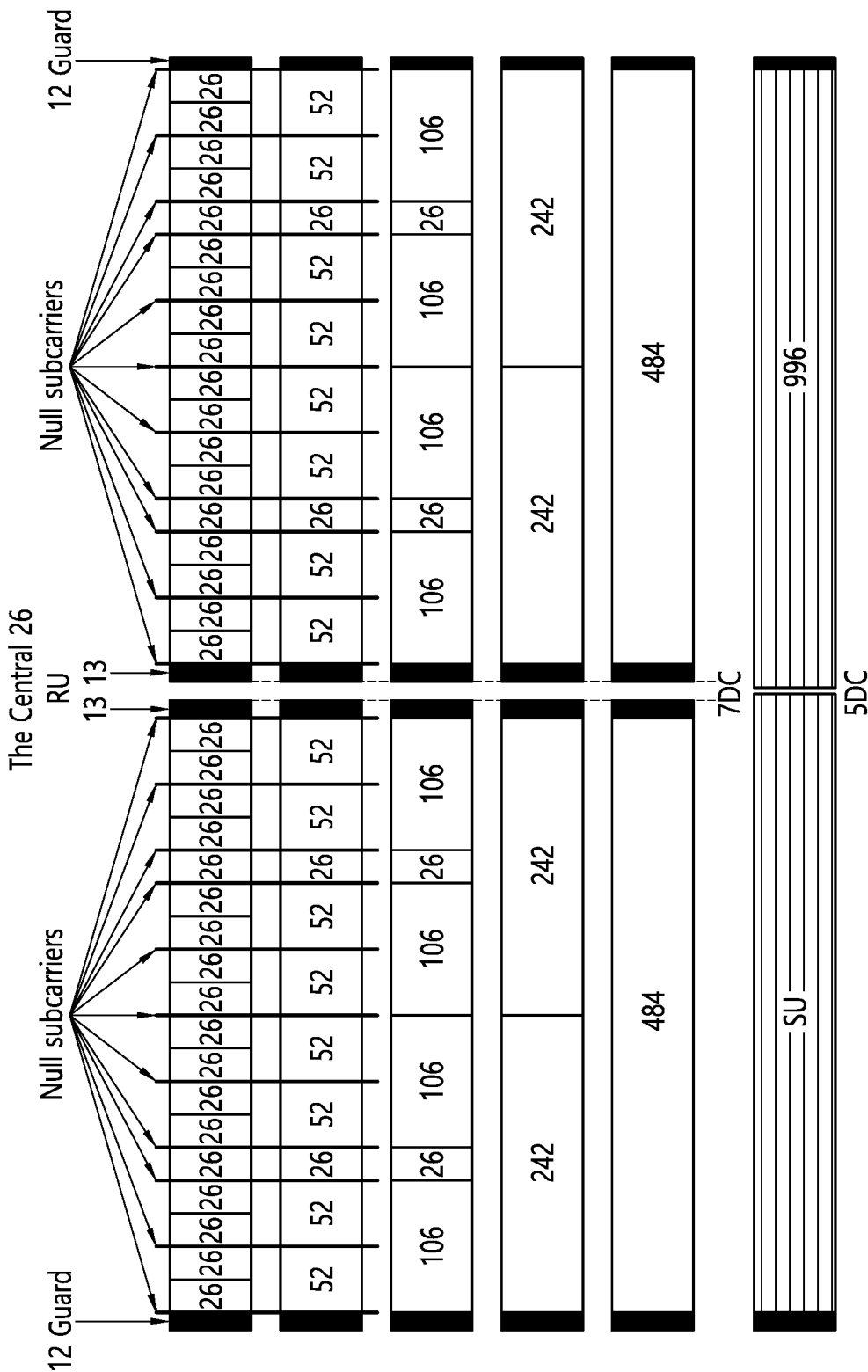
FIG. 6 illustrates a layout of RUs used in a band of 80 MHz.

FIG. 6 illustrates a layout of RUs used in a band of 80 MHz.

Similarly to FIG. 4 and FIG. 5 in which RUs having various sizes are used, a 26-RU, a 52-RU, a 106-RU, a 242-RU, a 484-RU, a 996-RU, and the like may be used in an example of FIG. 6. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 6, when the layout of the RUs is used for a single user, a 996-RU may be used, in which case five DC tones may be inserted.

The specific number of RUs may be changed similarly to FIG. 4 and FIG. 5.

Figure 7:
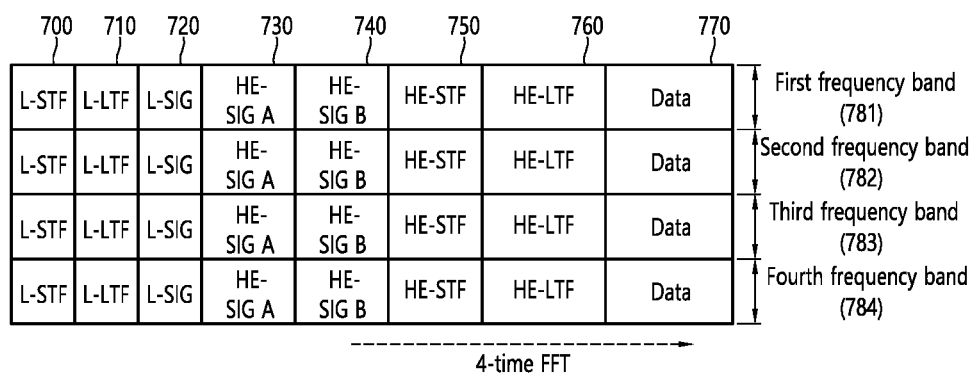
FIG. 7 illustrates another example of an HE PPDU.

FIG. 7 illustrates another example of an HE PPDU.

Technical characteristics of the HE PPDU illustrated in FIG. 7 may also be applied to an EHT PPDU to be newly proposed. For example, technical characteristics applied to an HE-SIG may also be applied to an EHT-SIG, and technical characteristics of an HE-STF/LTF may also be applied to an EHT-SFT/LTF.

An L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information about a data rate and a data length. Further, the L-SIG 720 may be repeatedly transmitted. That is, a format in which the L-SIG 720 is repeated (which may be referred to, for example, as an R-LSIG) may be configured.

An HE-SIG-A 730 may include control information common to a receiving STA.

Specifically, the HE-SIG-A 730 may include information about 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to an HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A specific field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Basically, an HE-SIG-A 750 or an HE-SIG-B 760 may include resource allocation information (or virtual resource allocation information) for at least one receiving STA.

An HE-STF 750 may be used for improving automatic gain control estimation in a multiple input multiple output (MIMO) environment or an OFDMA environment.

An HE-LTF 760 may be used for estimating a channel in the MIMO environment or the OFDMA environment.

The size of fast Fourier transform (FFT)/inverse fast Fourier transform (IFFT) applied to the HE-STF 750 and a field after the HE-STF 750 may be different from the size of FFT/IFFT applied to a field before the HE-STF 750. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field related to a legacy system, and the second field may include a field related to an HE system. In this case, the fast Fourier transform (FFT) size and the inverse fast Fourier transform (IFFT) size may be defined as a size which is N (N is a natural number, for example, N=1, 2, or 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 µs and the IDFT/DFT length applied to each symbol of the second field of the HE PPDU may be expressed as 3.2 µs*4 (=12.8 µs). The length of the OFDM symbol may be a value acquired by adding the length of a guard interval (GI) to the IDFT/DFT length. The length of the GI may have various values, such as 0.4 µs, 0.8 µs, 1.6 µs, 2.4 µs, and 3.2 µs.

For convenience of description, FIG. 7 shows that a frequency band used for the first field and a frequency band used for the second field accurately correspond to each other, but both frequency bands may not completely correspond to each other in actual. For example, a primary band of the first field (L-STF, L-LTF, L-SIG, HE-SIG-A, and HE-SIG-B) corresponding to the first frequency band may be the same as a primary band of the second field (HE-STF, HE-LTF, and Data), but boundaries of the respective frequency bands may not correspond to each other. As illustrated in FIG. 4 to FIG. 6, since a plurality of null subcarriers, DC tones, guard tones, and the like are inserted when arranging RUs, it may be difficult to accurately adjust the boundaries.

A user, that is, a receiving STA, may receive the HE-SIG-A 730 and may be instructed to receive a downlink PPDU based on the HE-SIG-A 730. In this case, the STA may perform decoding based on the FFT size changed from the HE-STF 750 and the field after the HE-STF 750. On the contrary, when the STA may not be instructed to receive a downlink PPDU based on the HE-SIG-A 730, the STA may stop decoding and may configure a network allocation vector (NAV). A cyclic prefix (CP) of the HE-STF 750 may have a larger size than a CP of another field, and the STA may decode a downlink PPDU by changing the FFT size in a period of the CP.

Hereinafter, in an embodiment, data (or a frame) transmitted from an AP to an STA may be referred to as downlink data (or a downlink frame), and data (a frame) transmitted from an STA to an AP may be referred to as uplink data (an uplink frame). Further, transmission from an AP to an STA may be referred to as downlink transmission, and transmission from an STA to an AP may be referred to as uplink transmission.

Figure 8:
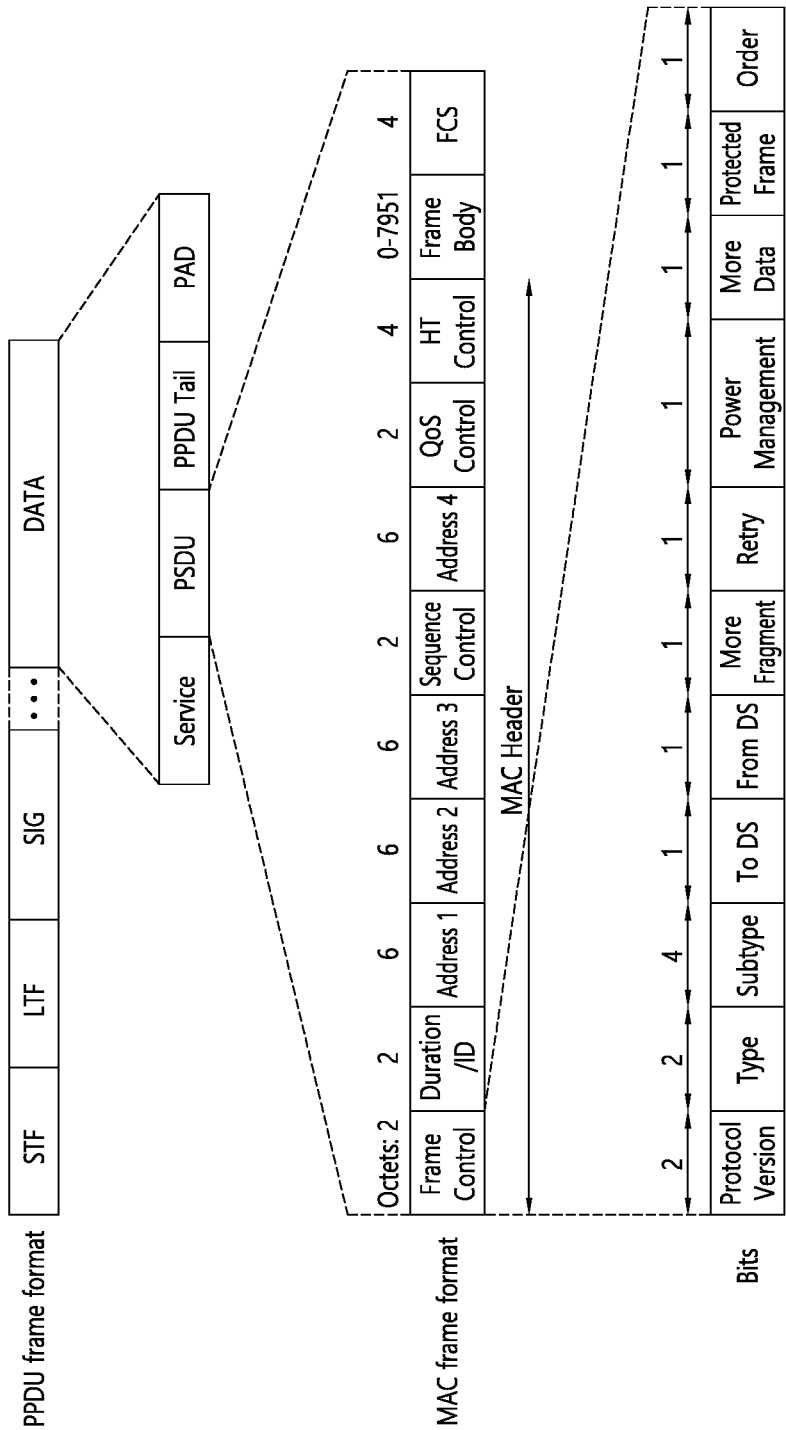
FIG. 8 illustrates an example of a frame structure used in an IEEE 802.11 system.

FIG. 8 illustrates an example of a frame structure used in an IEEE 802.11 system. An STF, an LTF, and a SIG field illustrated in FIG. 8 may be the same as or equivalent to the (HT/VHT/EHT)-STF, the LTF, and the SIG field illustrated in FIG. 3 or FIG. 7. Further, a data field illustrated in FIG. 8 may be the same as or equivalent to a data field illustrated in FIG. 3 or FIG. 7.

The data field may include a service field, a physical layer service data unit (PSDU), and a PPDU tail bit, and may optionally include a padding bit. Some bits of the service field may be used for synchronization of a descrambler at a receiving end. The PSDU may correspond to a MAC protocol data unit (MPDU) defined in a MAC layer and may include data generated/used in a higher layer. The PPDU tail bit may be used to return an encoder to a zero state. The padding bit may be used to adjust the length of the data field in a specific unit.

The MPDU is defined according to various MAC frame formats, and a basic MAC frame includes a MAC header, a frame body, and a frame check sequence (FCS). The MAC frame may include an MPDU and may be transmitted/received through a PSDU of a data part of a PPDU frame format.

The MAC header includes a frame control field, a duration/ID field, an address field, or the like. The frame control field may include control information required for frame transmission/reception. The duration/ID field may be set to a time for transmitting a corresponding frame or the like.

The duration/ID field included in the MAC header may be set to a 16-bit length (e.g., B0~B15). Content included in the duration/ID field may vary depending on a frame type and a subtype, whether it is transmitted during a contention free period (CFP), QoS capability of a transmitting STA, or the like. In a control frame of which a subtype is PS-poll, the duration/ID field may include an AID of a transmitting STA (e.g., through 14 LSBs), and two MSBs may be set to 1. (ii) In frames transmitted by a point coordinator (PC) or a non-QoS STA during a CFP, the duration/ID field may be set to a fixed value (e.g., 32768). (iii) In other frames transmitted by the non-QoS STA or control frames transmitted by the QoS STA, the duration/ID field may include a duration value defined for each frame type. In a data frame or management frame transmitted by the QoS STA, the duration/ID field may include a duration value defined for each frame type. For example, if the duration/ID field is set to B15=0, the duration/ID field is used to indicate a TXOP duration, and B0 to B14 may be used to indicate an actual TXOP duration. The actual TXOP duration indicated by B0 to B14 may be any one of 0 to 32767, and a unit thereof may be a microsecond (us). However, if the duration/ID field indicates a fixed TXOP duration value (e.g., 32768), B15=1 and B0 to B14=0. If set to B14=1 and B15=1, the duration/ID field is used to indicate an AID, and B0 to B13 indicate one AID ranging from 1 to 2007.

A frame control field of the MAC header may include Protocol Version, Type, Subtype, To DS, From DS, More Fragment, Retry, Power Management, More Data, Protected Frame, and Order subfields.

Hereinafter, multi-user (MU) transmission applied to this specification is described. A method and a device according to this specification support MU transmission. For example, for DL data, an orthogonal frequency-division multiple access (OFDMA) scheme and a multi-user multiple-input multiple-output (MU MIMO) scheme may be used, and a combination of the OFDMA scheme and the MU MIMO scheme may also be used. That is, a transmitting STA according to the present specification may allocate different RUs to a plurality of users (i.e., OFDMA) or may allocate different spatial streams on the same UR (i.e., MU-MIMO). Further, the transmitting STA may simultaneously use the OFDMA scheme and the MU MIMO scheme within one PPDU.

The transmitting STA according to the present specification may perform UL-MU communication using a trigger frame. Specific features of the trigger frame are described with reference to FIG. 9 to FIG. 11.

To trigger UL-MU communication, the transmitting STA (i.e., an AP) may obtain a TXOP to transmit a trigger frame via contention for accessing a medium. When the trigger frame is completely transmitted, a plurality of receiving STAs participating in the UL-MU communication simultaneously transmits a trigger-based (TB) PPDU after a certain time (e.g., SIFS). Basic technical features applied to the TB-PPDU are described in FIG. 3 and FIG. 7.

When UL-MU communication is used, the OFDMA scheme or the MU MIMO scheme may also be used, or the OFDMA scheme and the MU MIMO scheme may be used simultaneously.

Figure 9:
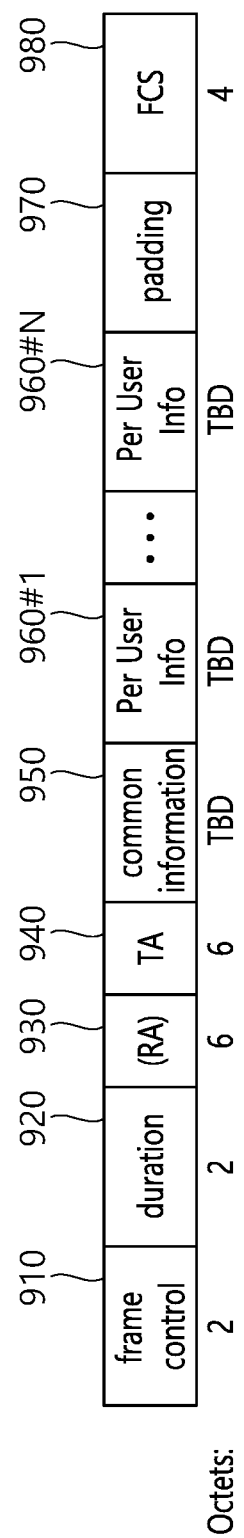
FIG. 9 illustrates an example of a trigger frame.

FIG. 9 illustrates an example of a trigger frame. The trigger frame illustrated in FIG. 9 allocates resources for uplink multiple-user (MU) transmission and may be transmitted from an AP. The trigger frame may be configured as a MAC frame and may be included in a PPDU. For example, the trigger frame may be transmitted through the PPDU illustrated in FIG. 3. If the trigger frame is transmitted through the PPDU of FIG. 3, the trigger frame may be included in the illustrated data field.

Some fields illustrated in FIG. 9 may be omitted, and other fields may be added. The length of each illustrated field may be varied.

A frame control field 910 shown in FIG. 9 may include information about a version of a MAC protocol and other additional control information, and a duration field 920 may include time information for NAV setting or information about an identifier (e.g., AID) of a STA.

An RA field 930 may include address information about a receiving STA of the trigger frame and may be optionally omitted. A TA field 940 includes address information about an STA (e.g., AP) for transmitting the trigger frame, and a common information field 950 includes common control information applied to the receiving STA for receiving the trigger frame. For example, a field indicating the length of an L-SIG field of an uplink PPDU transmitted in response to the trigger frame or information controlling the content of a SIG-A field (i.e., an HE-SIG-A field) of the uplink PPDU transmitted in response to the trigger frame may be included. Further, as the common control information, information about the length of a CP of the uplink PPDU transmitted in response to the trigger frame or information about the length of an LTF thereof may be included.

The trigger frame of FIG. 9 preferably includes per user information fields 960 #1 to 960 #N corresponding to the number of receiving STAs receiving the trigger frame of FIG. 9. A per user information field may also be referred to as an allocation field.

Further, the trigger frame of FIG. 9 may include a padding field 970 and a sequence field 980.

Each of the per user information fields 960 #1 to 960 #N illustrated in FIG. 9 preferably includes a plurality of subfields.

Figure 10:
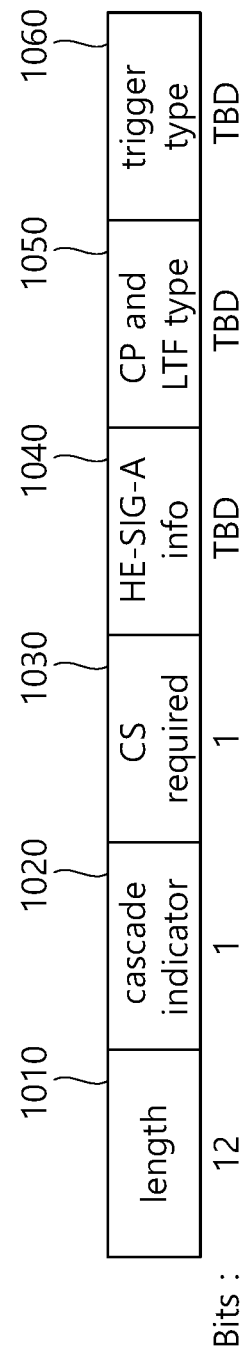
FIG. 10 illustrates an example of a common information field included in a trigger frame.

FIG. 10 illustrates an example of a common information field included in a trigger frame. Some subfields illustrated in FIG. 10 may be omitted, and other subfields may be added. The length of each illustrated subfield may be varied.

A length field 1010 has that same value as a length field of an L-SIG field of an uplink PPDU, which is transmitted in response to the trigger frame, and the length field of the L-SIG field of the uplink PPDU indicates the length of the uplink PPDU. As a result, the length field 1010 of the trigger frame may be used to indicate the length of the corresponding uplink PPDU.

A cascade indicator field 1020 indicates whether a cascade operation is performed. A cascade operation means that both downlink MU transmission and uplink MU transmission are performed within the same TXOP, that is, downlink MU transmission is performed, and then uplink MU transmission is performed after a preset period of time (e.g., SIFS). In the cascade operation, only one transmission device performing downlink communication (e.g., AP) may exist, and a plurality of transmission devices performing uplink communication (e.g., non-AP) may exist.

A CS request field 1030 indicates whether the status or NAV of a wireless medium is required to be considered in a situation where a reception device receiving the trigger frame transmits a corresponding uplink PPDU.

An HE-SIG-A information field 1040 may include information controlling the content of a SIG-A field (i.e., HE-SIG-A field) of the uplink PPDU transmitted in response to the trigger frame.

A CP and LTF type field 1050 may include information about an LTF length and a CP length of the uplink PPDU transmitted in response to the trigger frame. A trigger type field 1060 may indicate a purpose of the trigger frame, for example, general triggering, triggering for beamforming, a request for a block ACK/NACK, or the like.

In the present specification, it may be assumed that the trigger type field 1060 of the trigger frame indicates a trigger frame of a basic type for general triggering. For example, a trigger frame of a basic type may be referred to as a basic trigger frame.

Figure 11:
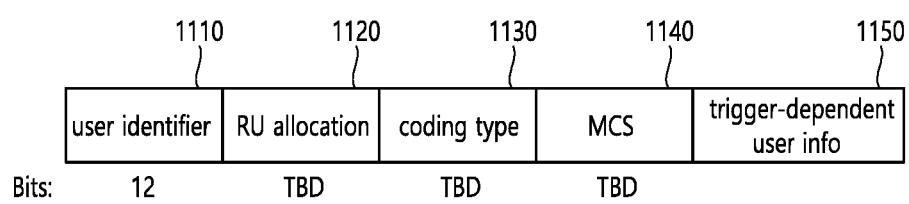
FIG. 11 illustrates an example of a subfield included in a per user information field.

FIG. 11 illustrates an example of a subfield included in a per user information field. The per user information field 1100 in FIG. 11 may be understood as one of the per user information fields 960 #1 to 960 #N illustrated above in FIG. 9. Some subfields included in the per user information field 1100 in FIG. 11 may be omitted, and other subfields may be added. The length of each illustrated subfield may be varied.

A user identifier field 1110 indicates an identifier of an STA (i.e., a receiving STA) which corresponds to the per user information, and an example of the identifier may be the entirety or part of an association identifier (AID) of the receiving STA.

A RU allocation field 1120 may be included in the per user information field. Specifically, when the receiving STA, which is identified by the user identifier field 1110, transmits an uplink PPDU in response to the trigger frame of FIG. 9, the STA transmits the uplink PPDU via an RU indicated by the RU allocation field 1120. In this case, it is preferable that the RU indicated by the RU allocation field 1120 corresponds to the RU illustrated in FIG. 4, FIG. 5, or FIG. 6.

A subfield of FIG. 11 may include a coding type field 1130. The coding type field 1130 may indicate the coding type of the uplink PPDU transmitted in response to the trigger frame of FIG. 9. For example, when BBC coding is applied to the uplink PPDU, the coding type field 1130 may be set to 1. When LDPC coding is applied to the uplink PPDU, the coding type field 1130 may be set to 0.

A subfield of FIG. 11 may include a coding type field 1130. The coding type field 1130 may indicate the coding type of the uplink PPDU transmitted in response to the trigger frame of FIG. 9. For example, when BBC coding is applied to the uplink PPDU, the coding type field 1130 may be set to 1. When LDPC coding is applied to the uplink PPDU, the coding type field 1130 may be set to 0.

In the present specification, a basic trigger frame may be understood as a variant of a trigger frame. A basic trigger frame may further include a trigger-dependent user info field 1150 in the per user information fields 960 #1 to 960 #N.

Hereinafter, an enhanced distributed channel access (EDCA) scheme, that is, an EDCA-based channel access method, is described.

Figure 12:
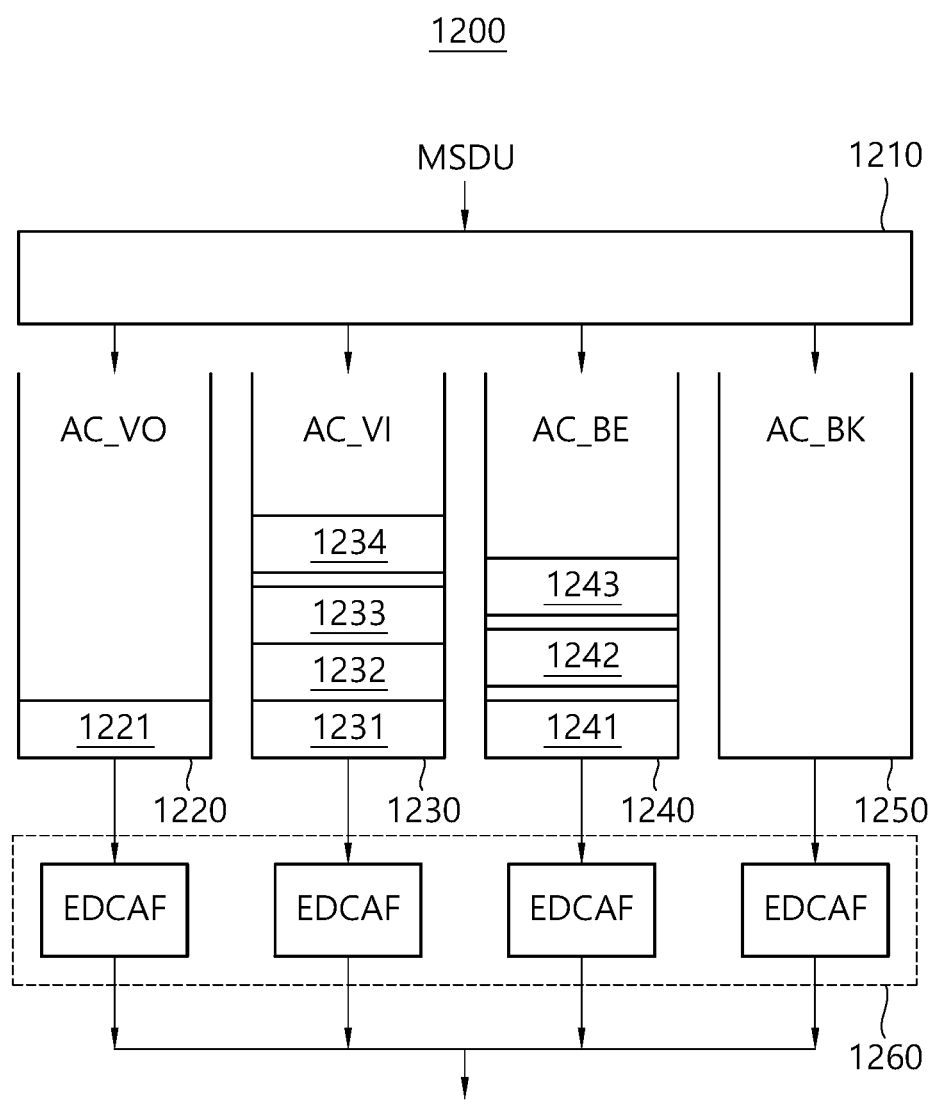
FIG. 12 illustrates an EDCA-based channel access method in a WLAN system.

FIG. 12 illustrates an EDCA-based channel access method in a WLAN system. In a WLAN system, an STA (or AP) may perform channel access according to a plurality of user priority levels defined for EDCA.

Specifically, in order to transmit a quality of service (QoS) data frame based on a plurality of user priority levels, four access categories (ACs, e.g., background (AC_BK), best effort (AC_BE), video (AC_VI), and voice (AC_VO)) may be defined.

The STA may receive traffic data (e.g., a MAC service data unit (MSDU)) having a preset user priority level from a higher layer (e.g., a logical link control (LLC) layer).

For example, in order to determine the transmission order of MAC frames to be transmitted by the STA, a differential value may be set for each set of traffic data in a user priority level. In this specification, a user priority level may be understood as a traffic identifier (hereinafter, "TID") indicating a characteristics of traffic data. For example, TID 1, 2, 0, 3, 4, 5, 6, and 7 may be mapped to AC_BK, AC_BK, AC_BE, AC_BE, AC_VI, AC_VI, AC_VO, and AC_VO, respectively.

That is, traffic data having a user priority level (i.e., TID) of 1 or 2 may be buffered in a transmission queue 1250 of an AC_BK type. Traffic data having a user priority level (i.e., TID) of 0 or 3 may be buffered in a transmission queue 1240 of an AC_BE type. Traffic data having a user priority level (i.e., TID) of 4 or 5 may be buffered in a transmission queue 1230 of an AC_VI type. Traffic data having a user priority level (i.e., TID) of 6 or 7 may be buffered in a transmission queue 1220 of an AC_VO type.

Instead of DCF interframe space (DIFS), CWmin, and CWmax, which are parameters for a backoff procedure based on a legacy distributed coordination function (DCF), a set (or group) of EDCA parameters, which are arbitration interframe space (AIFS)[AC], CWmin[AC], CWmax[AC], and TXOP limit[AC], may be used for a backoff procedure of a STA performing EDCA.

There may be a difference in transmission priority levels between ACs based on a set of differential EDCA parameters. The default values of the set of EDCA parameters (i.e., AIFS[AC], CWmin[AC], CWmax[AC], and TXOP limit [AC]) corresponding to each AC may be fixedly determined according to a WLAN standard.

For example, CWmin[AC], CWmax[AC], AIFS[AC], and TXOP limit[AC] for AC_BK may be determined to be 31, 1023, 7, and 0 ms. CWmin[AC], CWmax[AC], AIFS[AC], and TXOP limit[AC] for AC_BE may be determined to be 31, 1023, 3, and 0 ms, respectively. CWmin[AC], CWmax [AC], AIFS[AC], and TXOP limit[AC] for AC_VI may be determined to be 15, 31, 2, and 3.008 ms, respectively. CWmin[AC], CWmax[AC], AIFS[AC], and TXOP limit

[AC] for AC_VO may be determined to be 7, 15, 2, and 1.504 ms, respectively. These specific values may be changed.

The set of EDCA parameters for each AC may be configured to have default values or may be loaded in a beacon frame to be transmitted from an AP to each STA. As AIFS[AC] and CWmin[AC] have smaller values, AIFS[AC] and CWmin[AC] have higher priority levels, thus having a shorter delay in channel access delay and using a larger number of bands in a given traffic environment.

The set of EDCA parameters may include information about channel access parameters (e.g., AIFS [AC], CWmin [AC], and CWmax[AC]) for each AC.

A backoff procedure for EDCA may be performed based on a set of EDCA parameters individually configured for four ACs included in each STA. An adequate configuration of EDCA parameter values defining different channel access parameters for each AC may optimize network performance and may also increase the transmission effect by the priority level of traffic.

Therefore, in order to ensure or fair media access for all STAs participating in the network, the AP of the WLAN system needs to perform overall management and coordination functions for the EDCA parameters.

Referring to FIG. 12, one STA (or AP) 1200 may include a virtual mapper 1210, a plurality of transmission queues 1220 to 1250, and a virtual collision handler 1260. The virtual mapper 1210 of FIG. 12 may serve to map an MSDU received from a logical link control (LLC) layer to a transmission queue corresponding to each AC.

The plurality of transmission queues 1220 to 1250 may serve as individual EDCA contention entities for wireless media access within one STA (or AP). For example, the transmission queue 1220 of the AC_VO type of FIG. 12 may include one frame 1221 for a second STA (not shown).

The transmission queue 1230 of the AC_VI type may include three frames 1231 to 1233 for a first STA (not shown) and one frame 1234 for a third STA according to the order in which the frames are to be transmitted to a physical layer.

The transmission queue 1240 of the AC_BE type of FIG. 12 may include one frame 1241 for a second STA (not shown), one frame 1242 for a third STA (not shown), and one frame 1243 for a second STA (not shown) according to the order in which the frames are to be transmitted to the physical layer.

The transmission queue 1250 of the AC_BK type of FIG. 12 may not include a frame to be transmitted to the physical layer.

For example, the frame 1221 included in the transmission queue 1220 of the AC_VO type of FIG. 12 may be understood as one MAC Protocol Data Unit (MPDU) concatenated with a plurality of traffic data (i.e., MSDUs) received from a higher layer (i.e., the LLC layer).

Also, the frame 1221 included in the transmission queue 1220 of the AC_VO type of FIG. 12 may be understood as one MPDU concatenated with a plurality of traffic data (i.e., MSDUs) having a traffic identifier (TID) of either 6 or 7.

The frame 1231 included in the transmission queue 1230 of the AC_VI type of FIG. 12 may be interpreted and understood as one MAC Protocol Data Unit (MPDU) that is concatenated with a plurality of traffic data (i.e., MSDUs), which are received from a higher layer (i.e., LLC layer).

The frame 1231 included in the transmission queue 1230 of the AC_VI type of FIG. 12 may be understood as one MPDU concatenated with a plurality of traffic data (i.e., MSDUs) having a traffic identifier (TID) of either 4 or 5.

Similarly, each of the other frames 1232, 1233, and 1234 included in the transmission queue 1230 of the AC_VI type may be understood as one MPDU concatenated with a plurality of traffic data (i.e., MSDUs) having a traffic identifier (TID) of either 4 or 5.

The frame 1241 included in the transmission queue 1240 of the AC_BE type may be understood as one MPDU concatenated with a plurality of traffic data (i.e., MSDUs) having a traffic identifier (TID) of either 0 or 3.

Similarly, each of the other frames 1242 and 1243 included in the transmission queue 1240 of the AC_BE type may be understood as one MPDU concatenated with a plurality of traffic data (i.e., MSDUs) having a traffic identifier (TID) of any either 0 or 3.

Each of the frames 1221, 1231 to 1234, and 1241 to 1243 may be understood as a frame that does not exceed a predetermined traffic size.

When there are one or more ACs for which the backoff procedure has been completed at the same time, a collision between the ACs may be coordinated according to an EDCA function (EFCAF) included in the virtual collision handler 1260.

Specifically, a frame included in an AC having a higher priority level among colliding ACs may be transmitted first, thereby resolving a collision in a STA. In this case, other ACs may increase a contention window and may then update a backoff count using a backoff value reselected based on the increased contention window.

A transmission opportunity (TXOP) may be started when a channel is accessed in accordance with an EDCA rule. When two or more frames are accumulated in one AC, and if an EPCA TXOP is acquired, the AC of an EDCA MAC layer may attempt to transmit a plurality of frames. When the STA has already transmitted one frame, and if the STA can transmit a next frame in the same AC and can receive the ACK of the next frame within the remaining TXOP time, the STA may attempt to transmit the next frame after a time interval of SIFS.

A TXOP limit value may be set as a default value in the AP and the STA, or a frame related to the TXOP limit value may be transmitted to the STA from the AP.

When the size of a data frame to be transmitted exceeds the TXOP limit value, the AP may fragment the frame into a plurality of smaller frames. Subsequently, the fragmented frames may be transmitted within a range that does not exceed the TXOP limit value.

Figure 13:
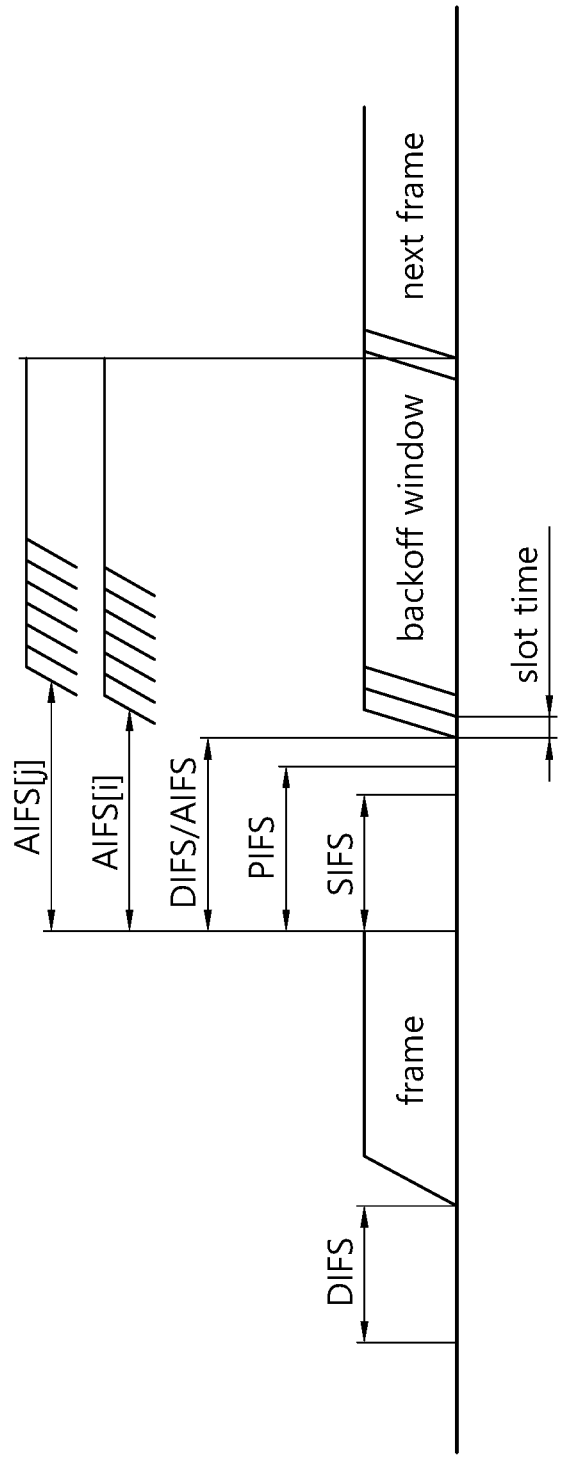
FIG. 13 is a conceptual view illustrating a backoff procedure of EDCA.

FIG. 13 is a conceptual view illustrating a backoff procedure of EDCA.

A plurality of STAs may share a wireless medium based on a distributed coordination function (hereinafter, "DCF"). In order to control a collision between STAs, the DCF may use carrier sense multiple access/collision avoidance (hereinafter, "CSMA/CA") as an access protocol.

In a channel access method using the DCF, if a medium is not occupied during one DCF inter frame space (DIFS) (i.e., if a channel is idle), a STA may transmit an MPDU internally determined.

When it is determined by a carrier sensing mechanism that the wireless medium is used by another STA (i.e., that the channel is busy), the STA may determine the size of a contention window (hereinafter, "CW") and may then perform a backoff procedure.

In order to perform the backoff procedure, each STA may configure a backoff value, which is arbitrarily selected within the contention window (CW), in a backoff counter. In this specification, a time representing a backoff value, which is selected by each STA, in slot times may be understood as the backoff window illustrated in FIG. 13.

Each STA may perform a backoff procedure for channel access by counting down a backoff window in slot times. Among the plurality of STAs, an STA selecting the relatively shortest backoff window may obtain a transmission opportunity (hereinafter, "TXOP") as the right to occupy a medium.

During a time period for the TXOP, the remaining STAs may suspend the countdown operation. The remaining STAs may wait until the time period for the TXOP expires. After the time period for the TXOP expires, the remaining STAs may resume the suspended countdown operation in order to occupy the wireless medium.

According to the transmission method based on the DCF, it is possible to prevent a collision which may occur when a plurality of STAs simultaneously transmits a frame. However, the channel access method using the DCF does not have the concept of a transmission priority level (i.e., a user priority level). That is, using the DCF cannot guarantee the quality of service (QoS) of traffic to be transmitted by a STA.

In order to resolve this problem, a hybrid coordination function (hereinafter, "HCF") as a new coordination function is defined in 802.11e. The newly defined HCF has more enhanced performance than the channel access performance of the legacy DCF. For enhancing QoS, the HCF may employ two different types of channel access methods, which are HCF-controlled channel access (HCCA) of a polling method and contention-based enhanced distributed channel access (EDCA).

Referring to FIG. 13, the STA assumes that EDCA is performed for the transmission of traffic data buffered in the STA. Referring to Table 1, user priority levels configured for individual traffic data may be differentiated to eight levels.

Each STA may include four types (AC_BK, AC_BE, AC_VI, and AC_VO) of output queues mapped to eight user priority levels in Table 1.

The STA according to this embodiment may transmit traffic data based on an arbitration interframe space (AIFS) corresponding to a user priority level instead of a DCF interframe space (DIFS) conventionally used.

To facilitate the understanding of this specification, interframe spacing mentioned in 802.11 will be described. For example, interframe spacing (IFS) may correspond to a reduced interframe space (RIFS), a short interframe space (SIFS), a PCF interframe space (PIFS), a DCF interframe space (DIFS), an arbitration interframe space (AIFS), or an extended interframe space (EIFS).

The interframe spacing (IFS) may be determined depending on attributes specified by the physical layer of the STA regardless of the bit rate of the STA. Among the IFSs, IFSs other than the AIFS may be understood as a fixed value for each physical layer.

The AIFS may be set to a value corresponding to the four types of transmission queues mapped to the user priority levels.

The SIFS has the shortest time gap among the IFSs mentioned above. Accordingly, the SIFS may be used when an STA occupying a wireless medium needs to maintain the occupation of the medium without any interruption by another STA during a period in which a frame exchange sequence is performed.

That is, by using the shortest gap between transmissions within a frame exchange sequence, the STA may be assigned priority to complete an ongoing frame exchange sequence. Also, the STA accessing the wireless medium by using the SIFS may immediately start transmission from the boundary of the SIFS without determining whether the medium is busy.

The duration of an SIFS for a specific physical (PHY) layer may be defined based on a SIFSTime parameter. For example, the SIFS has a value of 16 μs in physical (PHY) layers according to IEEE 802.11a, IEEE 802.11g, IEEE 802.11n, and IEEE 802.11ac.

The PIFS may be used in order to provide an STA with the next highest priority level after the SIFS. That is, the PIFS may be used to obtain priority for accessing the wireless medium.

The DIFS may be used by an STA transmitting a data frame (MPDU) and a management frame (MAC protocol data unit (MPDU)) on the basis the DCF. After a received frame and backoff time expire, when it is determined that the medium is idle by a CS mechanism, the STA may transmit a frame.

Figure 14:
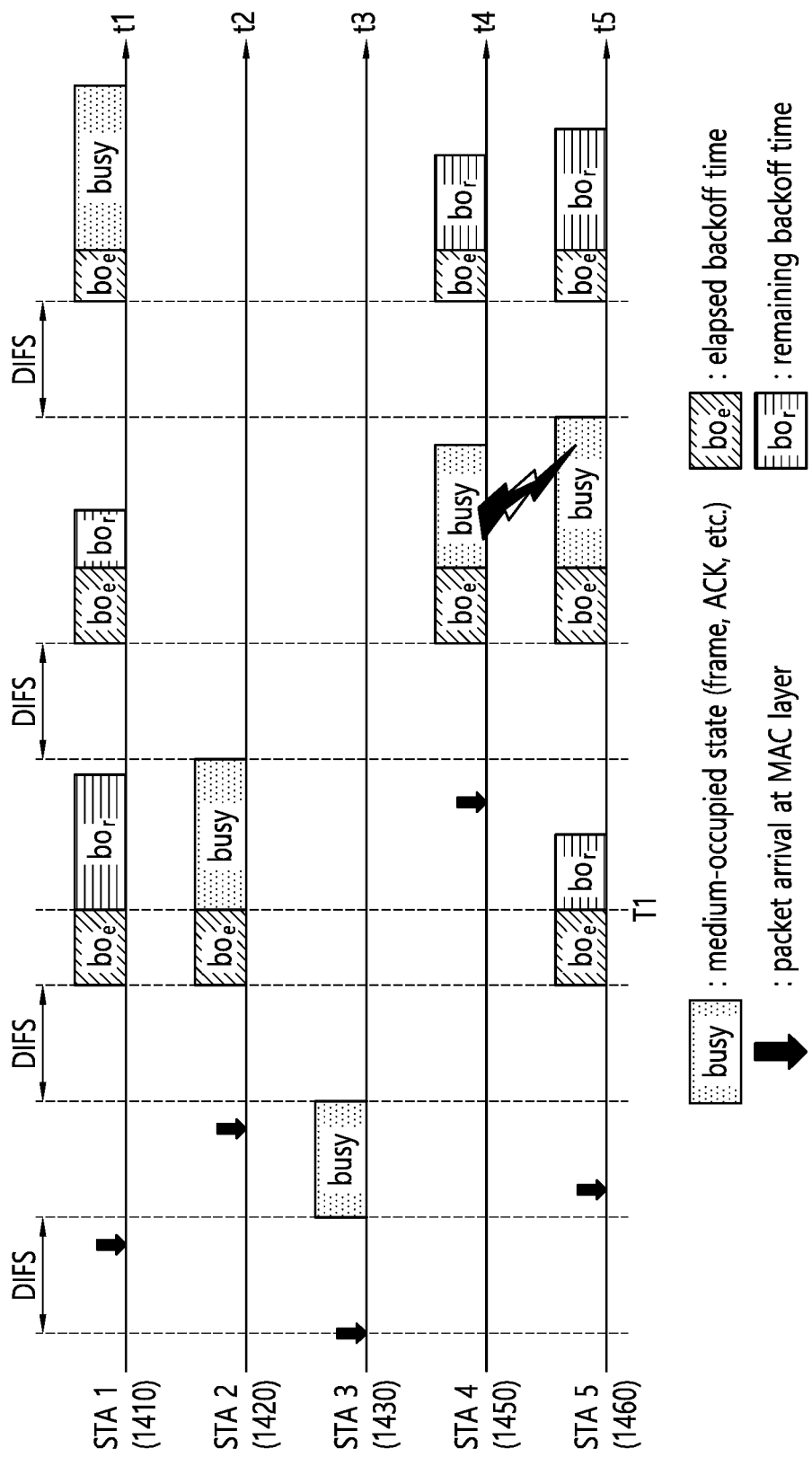
FIG. 14 illustrates a frame transmission procedure in a WLAN system.

FIG. 14 illustrates a frame transmission procedure in a WLAN system.

As described above, STAs 1410, 1420, 1430, 1440, and 1450 according to this embodiment may individually select a backoff value for a backoff procedure.

Each of the STAs 1410, 1420, 1430, 1440, and 1450 may attempt to perform transmission after waiting for time expressing the selected backoff value in slot time (i.e., the backoff window in FIG. 13).

Further, each of the STAs 1410, 1420, 1430, 1440, and 1450 may count down the backoff window by slot time. The countdown for channel access for a wireless medium may be individually performed by each STA.

Hereinafter, a time corresponding to the backoff window may be referred to as a random backoff time (Tb[i]). That is, each STA may individually set a backoff time (Tb[i]) in a random backoff counter for each STA.

Specifically, the random backoff time (Tb[i]) corresponds to a pseudo-random integer value and may be calculated by Equation 1 below.

$$Tb[i]=Random(i)*SlotTime$$

Random(i) in Equation 1 denotes a function using uniform distribution and generating a random integer between 0 and CW[i]. CW[i] may be construed as a contention window that is selected between a minimum contention window (CWmin[i]) and a maximum contention window (CWmax[i]). The minimum contention window (CWmin[i]) and the maximum contention window (CWmax[i]) may correspond to CWmin[AC] and CWmax[AC], which default values in Table 2.

In initial channel access, the STA may select a random integer between 0 and CWmin[i], with CW[i] set to CWmin[i]. In this embodiment, the selected random integer may be referred to as a backoff value.

i may be understood as the user priority level of traffic data. That is, i in Equation 1 may be understood as corresponding to any one of AC_VO, AC_VI, AC_BE, and AC_BK in Table 1.

SlotTime in Equation 1 may be used to provide sufficient time for a preamble of the transmitting STA to be fully detected by a neighboring STA. SlotTime in Equation 1 may be used to define the PIFS and the DIFS mentioned above. For example, SlotTime may be 9 μs.

For example, when the user priority level (i) is 7, an initial backoff time (Tb[AC_VO]) for a transmission queue of the AC_VO type may be time expressing a backoff value, which is selected between 0 and CWmin[AC_VO], in slot time.

When a collision occurs between STAs according to the backoff procedure (or when an ACK frame of a transmitted frame is not received), the STA may calculate increased backoff time (Tb[i]') by Equation 2 below.

$$CWnew[i]=((CWold[i]+1)*PF)-1$$

Referring to Equation 2, a new contention window ($CW_{new}[i]$) may be calculated based on a previous contention window ($CW_{old}[i]$). PF in Equation 2 may be calculated in accordance with a procedure defined in IEEE 802.11e. For example, PF in Equation 2 may be set to 2.

In this embodiment, the increased backoff time (Tb[i]') may be construed as time expressing a random integer (i.e., backoff value), which is selected between 0 and the new contention window ($CW_{new}[i]$), in slot time.

CWmin[i], CWmax[i], AIFS[i], and PF values mentioned in FIG. 14 may be signaled from an AP through a QoS parameter set element, which is a management frame. The CWmin[i], CWmax[i], AIFS[i], and PF values may be values preset by the AP and the STA.

Referring to FIG. 14, the horizontal axis (t1 to t5) for first to fifth STAs 1410 to 1450 may indicate a time axis. The vertical axis for the first to fifth STAs 1410 to 1450 may indicate backoff time.

Referring to FIG. 13 and FIG. 14, if a particular medium is changed from an occupied or busy state to an idle state, the plurality of STAs may attempt to transmit data (or a frame).

Here, to minimize a collision between STAs, each STA may select backoff time (Tb[i]) according to Equation 1 and may attempt transmission after waiting for slot time corresponding to the selected backoff time.

When a backoff procedure is initiated, each STA may count down individually selected backoff counter time by slot times. Each STA may continuously monitor the medium while performing the countdown.

When the wireless medium is determined to be occupied, the STAs may suspend the countdown and may wait. When the wireless medium is determined to be idle, the STAs may resume the countdown.

Referring to FIG. 14, when a frame for the third STA 1430 reaches the MAC layer of the third STA 1430, the third STA 1430 may determine whether the medium is idle during a DIFS. When it is determined that the medium is idle during the DIFS, the third STA 1430 may transmit the frame to the AP (not shown). Here, although FIG. 14 shows the DIFS as an interframe space (IFS), it should be note that this specification will not be limited thereto.

While the frame is transmitted from the third STA 1430, the remaining STAs may check the occupancy state of the medium and may wait for the transmission period of the frame. A frame may reach the MAC layer of each of the first STA 1410, the second STA 1420, and the fifth STA 1450. When it is determined that the medium is idle, each STA may wait for the DIFS and may then count down backoff time individually selected by each STA.

FIG. 14 shows that the second STA 1420 selects the shortest backoff time and the first STA 1410 selects the longest backoff time. FIG. 14 shows that the remaining backoff time for the fifth STA 1450 is shorter than the remaining backoff time for the first STA 1410 at the time (T1) when a backoff procedure for the backoff time selected by the second STA 1420 is completed and the transmission of a frame starts.

When the medium is occupied by the second STA 1420, the first STA 1410 and the fifth STA 1450 may suspend the backoff procedure and may wait. When the second STA 1420 finishes occupying the medium (i.e., when the medium returns to be idle), the first STA 1410 and the fifth STA 1450 may wait for the DIFS.

Subsequently, the first STA 1410 and the fifth STA 1450 may resume the backoff procedure based on the suspended remaining backoff time. In this case, since the remaining backoff time for the fifth STA 1450 is shorter than the remaining backoff time for the first STA 1410, the fifth STA 1450 may complete the backoff procedure before the first STA 1410.

Referring to FIG. 14, when the medium is occupied by the second STA 1420, a frame for the fourth STA 1440 may reach the MAC layer of the fourth STA 1440. When the medium is idle, the fourth STA 1440 may wait for the DIFS. Subsequently, the fourth STA 1440 may count down the backoff time selected by the fourth STA 1440.

Referring to FIG. 14, the remaining backoff time for the fifth STA 1450 may coincidently match the remaining backoff time for the fourth STA 1440. In this case, a collision may occur between the fourth STA 1440 and the fifth STA 1450. If the collision occurs between the STAs, both the fourth STA 1440 and the fifth STA 1450 may not receive an ACK and may fail to transmit data.

Accordingly, the fourth STA 1440 and the fifth STA 1450 may individually calculate a new contention window ($CW_{new}[i]$) according to Equation 2. Subsequently, the fourth STA 1440 and the fifth STA 1450 may individually count down backoff time newly calculated according to Equation 2.

When then medium is occupied state due to transmission by the fourth STA 1440 and the fifth STA 1450, the first STA 1410 may wait. Subsequently, when the medium is idle, the first STA 1410 may wait for the DIFS and may then resume backoff counting. After the remaining backoff time for the first STA 1410 elapses, the first STA 1410 may transmit a frame.

The CSMA/CA mechanism may include virtual carrier sensing in addition to physical carrier sensing in which an AP and/or STA directly senses a medium.

Virtual carrier sensing is used to address any problem that may occur in access to a medium, such as a hidden node problem. For virtual carrier sensing, the MAC of a WLAN system uses a network allocation vector (NAV). The NAV is a value representing remaining time for a medium to be available, which is indicated by an AP and/or STA currently using the medium or having the right to use the medium to another AP and/or STA.

Therefore, a value set as the NAV corresponds to a period in which an AP and/or STA transmitting a frame is scheduled to use a medium, and an STA receiving the NAV value is prohibited from accessing the medium during the period. The NAV may be set, for example, according to the value of a duration field in an MAC header.

The NAV may be understood as a timer for protecting the TXOP of a transmitting STA (e.g., a TXOP holder). A STA may not perform channel access in a period during which an NAV set for the STA is value, thereby protecting the TXOP of a different STA.

Figure 15:
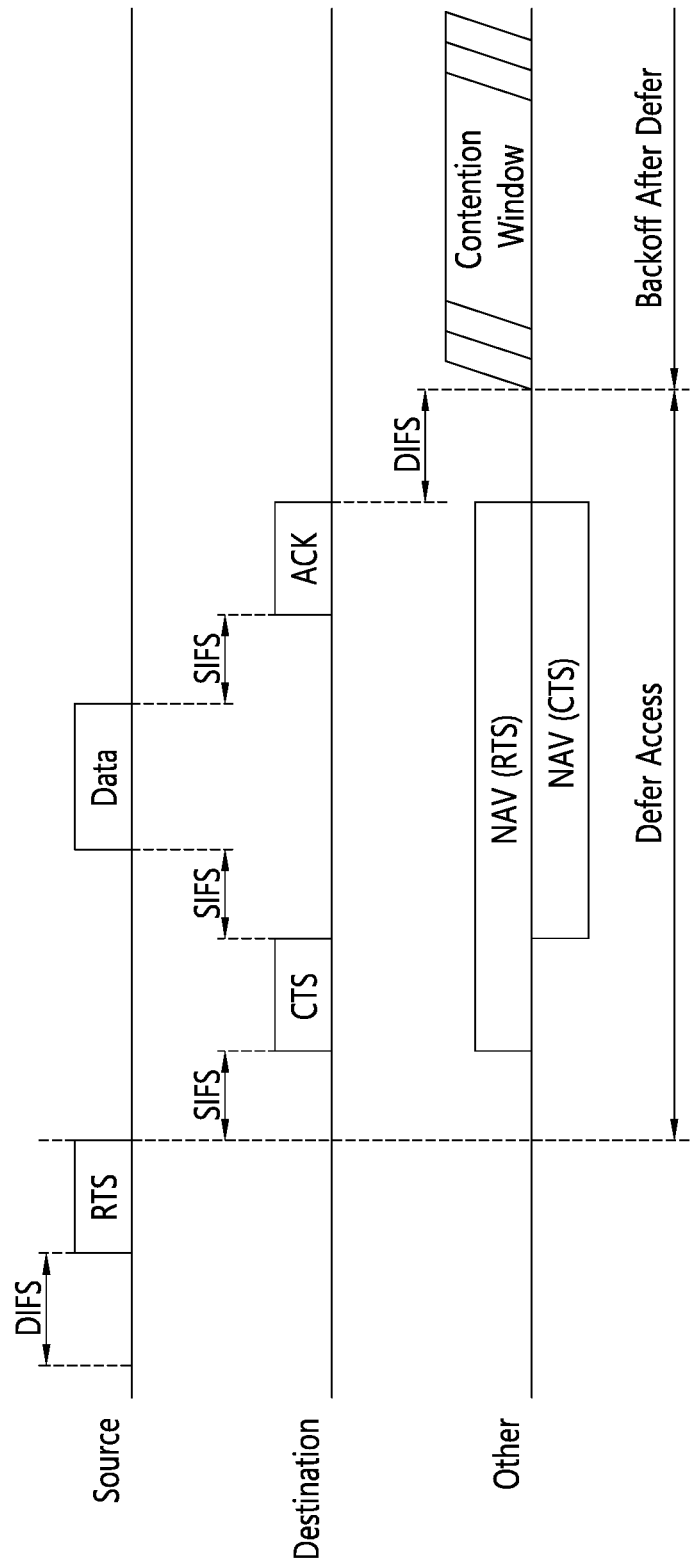
FIG. 15 illustrates an example of setting an NAV.

FIG. 15 illustrates an example of setting an NAV.

Referring to FIG. 15, a source STA transmits an RTS frame, and a destination STA transmits a CTS frame. As described above, the destination STA designated as a receiver through the RTS frame does not set an NAV. Some other STAs may receive the RTS frame to set up an NAV, and some other STAs may receive the CTS frame to set up an NAV.

If the CTS frame (e.g., a PHY-RXSTART.indication primitive) is not received within a certain period from when the RTS frame is received (e.g., when a MAC receives a PHY-RXEND.indication primitive corresponding to the RTS frame), the STAs setting or updating the NAV through the RTS frame may reset the NAV (e.g., to 0). The certain period may be (2*aSIFSTime+CTS_Time+aRxPHYStart-Delay+2*aSlotTime), where CTS_Time may be calculated based on the length of the CTS frame indicated by the RTS frame and a data rate.

Although FIG. 15 shows that an NAV is set or updated through an RTS frame or a CTS frame for convenience, NAV setting/resetting/updating may be performed based on a duration field of various other frames, such as a non-HT PPDU, an HT PPDU, a VHT PPDU, or an HE PPDU, (e.g., a duration field in a MAC header of a MAC frame). For example, a STA may set/reset/update an NAV if an RA field in a received MAC frame does not match an address (e.g., MAC address) of the STA.

Hereinafter, a technique for controlling uplink communication of an STA according to the present specification is described. The present specification proposes a technique for controlling an uplink access method of a STA in a WLAN system. For example, uplink access may be contention-based uplink access. For example, an example of contention-based uplink access may be enhanced distributed channel access (EDCA) illustrated in FIG. 12 to FIG. 14.

In the present specification, a STA may use at least two techniques for uplink communication. For example, a first technique based on a trigger frame from an AP and a second technique based on contention described above may be used. Specifically, according to the first technique, the STA may receive a trigger frame triggering UL MU communication from the AP and may configure a trigger-based (TB) PPDU based on uplink resource information included in the trigger frame, thereby performing uplink communication. Further, according to the second technique, the STA may access a medium based on EDCA, thereby performing uplink communication. The STA according to the present specification may perform uplink communication only through the first and second techniques during a specific period set through a beacon or the like. Alternatively, the STA according to the present specification may perform uplink communication through an additional technique in addition to the first/second technique.

The conventional IEEE 802.11ax standard proposes a technique for increasing UL MU gain by proposing a MU EDCA parameter. For example, a technique for reducing the EDCA access probability of a STA by an AP setting a relatively large MU EDCA parameter is proposed. Specifically, the IEEE 802.11ax standard defines a new MU EDCA parameter in addition to a legacy EDCA parameter and proposes a technique enabling a STA capable of UL MU to perform EDCA based on the MU EDCA parameter instead of the legacy EDCA parameter.

However, in some cases, it is not preferable for a STA to perform EDCA. That is, in some cases, it is very difficult for the STA transmit uplink data based on EDCA. For example, when the STA exists at the edge of the BSS, it may be preferable for the STA to transmit uplink data through UL MU instead of EDCA due to a problem about transmission power of the STA. That is, it may be preferable for the STA to transmit a TB PPDU based on a trigger frame.

When the STA performs uplink communication through the TB PPDU, the STA can perform uplink communication with a relatively small bandwidth as compared with EDCA, thus successfully performing uplink communication with limited transmission power. For example, when uplink data is transmitted through EDCA, a 20-MHz band (or 20*N MHz) is needed for transmission. However, when a TB PPDU is used, transmission with a narrow band, such as 26-RU or 52-RU, is possible, thus being favorable for the STA positioned at the boundary of the BSS.

Accordingly, the present specification proposes a new operation/mode/state of disabling/suspending/inactivating/prohibiting an EDCA operation of a STA. For convenience of description, when an EDCA operation/connection of a STA is disabled/suspended/inactivated/prohibited, it may be expressed that an EDCA-disabling operation is performed/applied. Accordingly, when an EDCA-disabling operation is performed/applied, the STA cannot perform an EDCA operation (i.e., EDCA-based medium access) until the EDCA operation is resumed, and thus the STA may perform uplink communication through UL MU (i.e., a TB PPDU). In some cases, when an EDCA-disabling operation is performed/applied to a specific STA, the STA may perform uplink communication only through UL MU (i.e., a TB PPDU).

EDCA-Disabling Condition

Hereinafter, a condition in which an EDCA-disabling operation is performed/applied (i.e., an EDCA-disabling condition) is described. Illustrative EDCA-disabling conditions are as follows. That is, an EDCA operation/connection of a STA may be disabled/suspended/inactivated/prohibited based on the following conditions. The following conditions may be used individually, or different conditions thereof may be used at the same time.

Condition 1: Threshold Values of Downlink Received Signal Strength Indication (DL RSSI) and/or DL Signal-To-Noise Ratio (SNR)

When the threshold values of a DL RSSI and/or a DL SNR of a downlink are not satisfied, the EDCA-disabling operation may be performed. For example, when a value smaller than the threshold value is measured, the EDCA-disabling operation of the STA may be performed.

Condition 2: Threshold Value of Uplink (UL) Power Headroom

When the threshold value of UL power headroom is not satisfied, the EDCA-disabling operation may be performed. For example, a trigger frame may include the threshold value of UL power headroom of a TB PPDU. When a UL power headroom value obtained for the STA is smaller than the value included in the trigger frame, the EDCA-disabling operation of the STA may be performed.

Condition 3: Threshold Value of Number of Failed SU Transmissions

When the number of failed SU transmissions of the STA exceeds a threshold value, the EDCA-disabling operation may be performed. For example, condition 3 may be information about the number of successively failed SU transmissions.

Condition 4: Contention Window Size Among MU EDCA Parameters

The EDCA-disabling operation may be performed depending on whether a contention window for the STA reaches the maximum value. For example, when the contention window for the STA reaches the maximum value (e.g., 1024), the EDCA-disabling operation of the STA may be performed. The contention window reaching the maximum value indicates a very congested state. Therefore, when EDCA is performed with the contention window reaching the maximum value, the channel state may worsen. Accordingly, the EDCA-disabling operation may be performed based on the contention window for the STA.

The EDCA-disabling conditions may be transmitted to the STA by various methods. For example, information about the EDCA-disabling conditions may be transmitted from an AP through an association response/beacon, a recently received trigger frame, various other MAC frames, or other various PHY preambles. Alternatively, the EDCA-disabling conditions may already be stored in the STA.

EDCA-Disabling Operation

An EDCA-disabling operation of a STA may be performed in various ways. For example, the STA may directly determine whether to disable an EDCA operation. Alternatively, an AP may determine whether to disable EDCA. Various embodiments of the EDCA-disabling operation are illustrated below.

Hereinafter, an example in which a STA directly determines whether to disable an EDCA operation is proposed.

First, when an EDCA operation of a STA is disabled, the STA may have fewer opportunities for UL access (i.e., a fairness problem) than other STAs. Therefore, the STA according to the present specification may determine whether to disable the EDCA operation and may then transmit information about the determination (i.e., information about the determination result) to an AP. That is, when the STA disables the EDCA operation, the STA may transmit information about EDCA disabling (i.e., information indicating EDCA disabling) through a UL frame.

Upon receiving the information about EDCA disabling, the AP may configure a trigger frame based on the information. That is, the AP may determine the position and/or size of a UL RU (i.e., a UL RU used for a TB PPDU) included in the trigger frame based on the information about EDCA disabling. For example, the AP may allocate only an RU having a first size or smaller (e.g., a 26-RU or a 52-RU) in a trigger frame subsequently transmitted for the EDCA-disabled STA. The first size may be determined by various methods. For example, the STA may report in advance information about the first size (e.g., a 26-RU or a 52-RU) through various MAC frames or MAC header information. That is, the STA may provide recommendation information about the first size in advance. Through the foregoing operation, the fairness problem may be reduced.

Figure 16:
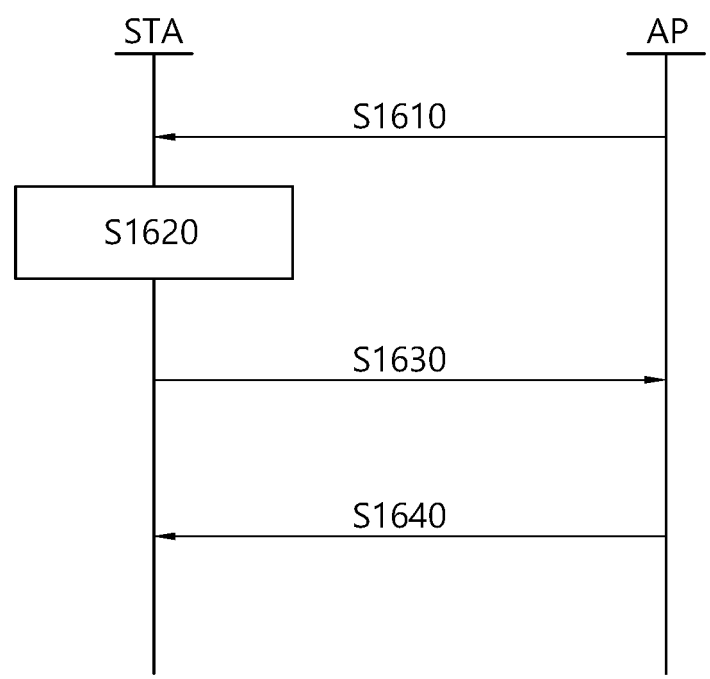
FIG. 16 is a procedure flowchart illustrating an example of an EDCA-disabling operation according to the present specification.

FIG. 16 is a procedure flowchart illustrating an example of an EDCA-disabling operation according to the present specification. Some of illustrated steps may be omitted, and the order of the steps may be changed. The example illustrated FIG. 16 relates to an example in which a STA directly determines whether to disable an EDCA operation.

In S1610, a STA may receive/obtain control information about an EDCA-disabling operation. For example, the STA may receive at least one parameter (e.g., a DL RSSI illustrated above) related to an EDCA-disabling condition for the STA in S1610.

The STA may determine whether to disable an EDCA operation of the STA based on the control information received/obtained in S1610 (S1620). For example, the STA may determine whether the EDCA-disabling condition is satisfied, and may choose/determine to disable the EDCA operation of the STA based on the determination.

When the STA determines to disable EDCA, the STA may immediately apply the EDCA-disabling operation before transmitting an additional signal to an AP. In this case, S1630 or S1640 may be omitted.

Additionally or alternatively, the STA may transmit the result of determination in S1620 to the AP (S1630), and may apply the EDCA-disabling operation after receiving additional control information from the AP (S1640). For example, S1630 may be a request to disable EDCA, and S1640 may be a response to S1630. The response to S1640 may include information about acceptance or rejection.

For example, S1630 may be performed through a general UL frame (e.g., a UL PPDU including a flag field in a legacy or new field of a MAC header). In addition, S1640 may be performed based on an immediate response corresponding to the UL frame in S1630. For example, the information in S1640 may be received through an ACK or block ACK (BA) frame for the UL frame in S1630. Alternatively, the information in S1640 may be received through a separate DL frame.

When S1630 is a request to disable EDCA, the AP may accept or reject the request based on various pieces of information. For example, the AP may determine whether to accept/reject the request based on the size of a resource for UL MU at the time when S1630 is performed. That is, the AP may reject the request in S1630 when the size of the resource for UL MU is a threshold value or smaller.

S1610 and/or S1620 may be repeatedly performed. For example, when the EDCA-disabling condition is updated, the AP may further perform S1610. Alternatively, even though the EDCA-disabling condition is not updated, S1610 may be repeatedly performed in a preset time interval.

The STA may repeatedly determine whether the EDCA-disabling condition is satisfied based on an EDCA-disabling condition already received/obtained. For example, after the EDCA-disabling condition is satisfied, when the STA determines that the EDCA-disabling condition is no longer satisfied (S1620), the STA may resume the EDCA operation of the STA. Resumption of an EDCA operation may be expressed as continuation of participation in an EDCA operation.

The EDCA operation may be resumed immediately after S1620 or may be resumed after S1640. That is, the STA may immediately resume the EDCA operation without request/permission to resume the EDCA operation. Alternatively, the STA may transmit information about the resumption of the EDCA operation to the AP (e.g., transmit a UL PPDU including a flag field in a legacy or new field of a MAC header) in S1630 and may receive information about acceptance or rejection of the resumption of the EDCA operation in S1640.

A condition for resuming the EDCA operation may be the same as the above-described EDCA-disabling conditions or may be defined separately. That is, a threshold value for disabling EDCA and a threshold value for resuming EDCA may be defined separately.

According to the foregoing details, the STA may perform the following operations. The STA may calculate whether the target RSSI of the AP can be satisfied when transmitting a SU PPDU based on the target RSSI of the AP, the size of a scheduled RU, a MCS, AP TX power, and STA power headroom information included in a recently received trigger frame. When there is TX power headroom information while satisfying the target RSSI, the STA determines to be able to perform SU transmission and may resume EDCA.

That is, the STA may obtain an EDCA-disabling condition (or a condition for resuming the EDCA operation) (S1610) and may determine whether to disable or resume EDCA based on the condition (S1620).

As described above, S1630 may be performed through frames in various formats. For example, the STA may include information about EDCA disabling by inserting a one-bit flag into a legacy OM control field.

FIG. 17 illustrates an example of an OM control field for S1630. As illustrated, an EDCA access disable bit may be included in the OM control field and may indicate information about EDCA disabling (e.g., information about the result of determination in S1620).

Figure 18:
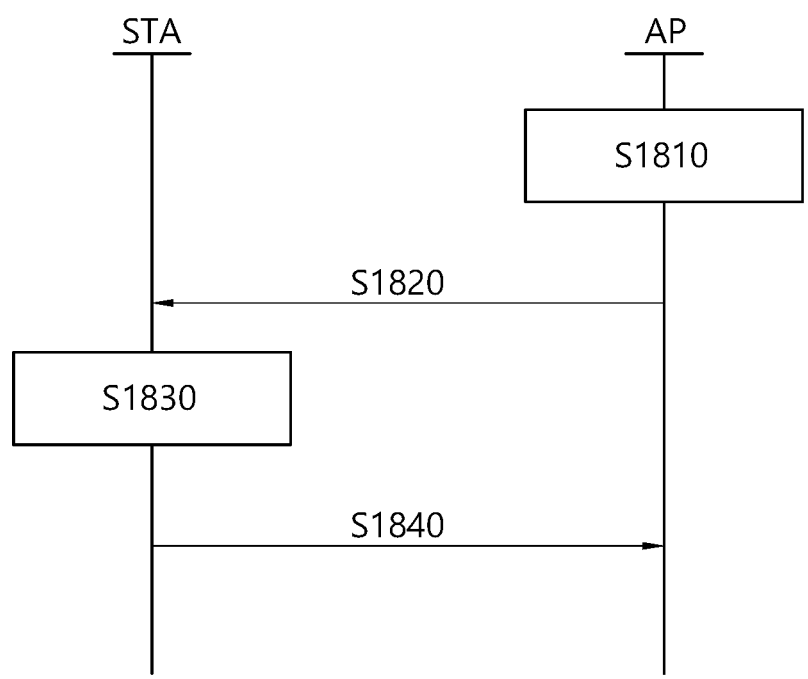
FIG. 18 is a procedure flowchart illustrating another example of an EDCA-disabling operation according to the present specification.

FIG. 18 is a procedure flowchart illustrating another example of an EDCA-disabling operation according to the present specification. Some of illustrated steps may be omitted, and the order of the steps may be changed. The example illustrated FIG. 18 relates to an example in which an AP determines whether to disable an EDCA operation of a STA.

In S1810, an AP may determine whether to disable an EDCA operation of a STA based on control information about an EDCA-disabling operation (i.e., the foregoing EDCA-disabling condition). For example, when the AP transmits a trigger frame and receives an HE TB PPDU from the STA before S1810, the AP may determine whether to disable or enable EDCA of the STA using TX power headroom information and RSSI information transmitted by the STA. The EDCA-disabling condition used in S1810 may be the same as the condition used in S1610.

The AP may instruct/command the STA to disable EDCA based on S1810 (S1820). S1820 may be performed based on various DL frames (e.g., a DL PPDU including a flag field in a legacy or new field of a MAC header).

After receiving the instruction/command to disable EDCA in S1820, the STA may immediately disable the EDCA operation of the STA (S1830).

In S1830, the STA may not immediately apply an EDCA-disabling operation. For example, the STA may determine whether to accept or reject the instruction/command from the AP in S1830. Here, the STA may determine whether to accept or reject the indication/command from the AP in consideration of the size and priority level of buffered traffic stored in a UL buffer, UL power headroom, and DL and/or UL channel states.

In S1840, the STA may transmit information about the result of determination in S1830 to the AP. That is, information about whether the STA accepts or rejects the instruction/command from the AP may be transmitted in S1840. S1840 may be performed through various types of UL frames (e.g., a UL PPDU including a flag field in a legacy or new field of a MAC header). For example, S1840 may be performed through the OM control field illustrated in FIG. 17.

When the STA accepts the instruction/command from the AP, the EDCA-disabling operation may be applied immediately after S1840. When the STA rejects the instruction/command from the AP, the STA may access a medium based on the EDCA operation.

Similarly to the example of FIG. 16, the steps of FIG. 18 may be repeatedly performed. For example, when the EDCA-disabling condition is updated as in the example of FIG. 16, steps from S1810 may be performed again. Further, when the AP determines that the EDCA-disabling condition is no longer satisfied in S1810 as in the example of FIG. 16, the AP gives an instruction/command to resume EDCA. The instruction/command to resume EDCA may be performed in S1820.

In this specification, the AP or the STA may determine whether to disable the EDCA operation of the STA. For example, a mode in which the STA determines EDCA disabling may be referred to as a first determination mode, and a mode in which the AP determines EDCA disabling may be referred to as a second determination mode. That is, the first determination mode is related to the example of FIG. 16, and the second determination mode is related to the example of FIG. 18.

The STA and the AP may selectively use the first/second determination modes. For example, a particular STA may support only one determination mode or all the determination modes. In addition, a particular AP may support only one determination mode or all the determination modes. The STA and the AP may negotiate capability information about a determination mode through an association process described with reference to FIG. 2. Subsequently, the STA and the AP may selectively use the first determination mode or the second determination mode based on a negotiated determination mode.

The examples of the present specification may be further modified below.

As described above, the EDCA operation of the STA may be disabled/suspended/inactivated/prohibited according to the determination of the STA or the AP. When an EDCA operation of a particular STA is disabled through various examples of FIG. 16 and FIG. 18, it is preferable that the AP frequently allocates an uplink RU (i.e., a UL MU resources used for a TB PPDU) through a trigger frame. For example, it may be preferable that the AP allocates a narrow bandwidth (e.g., a 26-RU or a 52-RU) through a trigger frame for a STA having an EDCA operation disabled and more frequently allocates an RU resource to the STA. For this operation, it is important for the STA to be allocated more buffer status report (BSR) resources. That is, since the AP can determine a UL MU resource based on a BSR from the STA, it is preferable to allocate more BSR resources to the STA having EDCA disabled (i.e., the EDCA-disabled STA).

The STA may transmit a BSR based on UL OFDMA random access (UORA) defined according to the IEEE 802.11ax standard.

Figure 19:
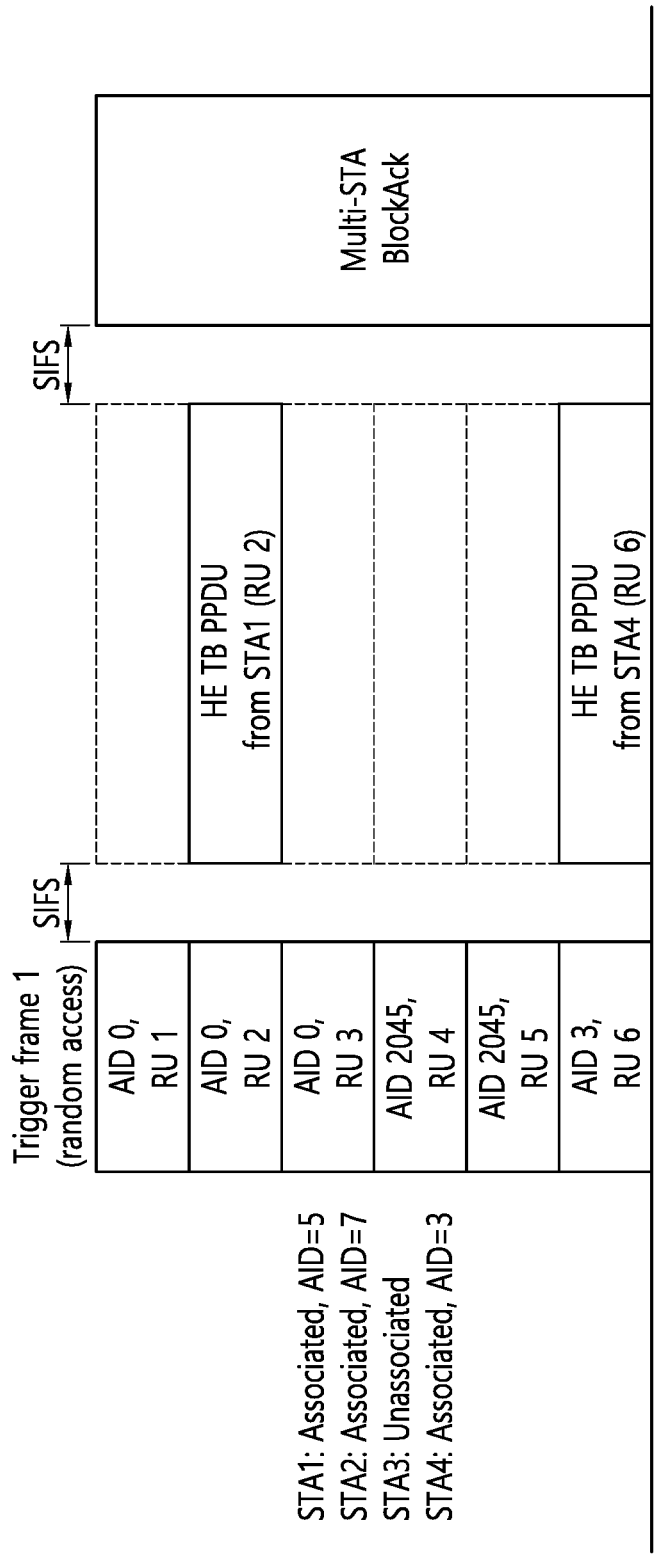
FIG. 19 illustrates a method of performing UORA in a WLAN system.

FIG. 19 illustrates a method of performing UORA in a WLAN system.

As illustrated in FIG. 19, an AP may allocate six RU resources through a trigger frame (e.g., illustrated in FIG. 9 to FIG. 11). Specifically, the AP may allocate a first RU resource (AID 0, RU 1), a second RU resource (AID 0, RU 2), a third RU resource (AID 0, RU 3), a fourth RU resource (AID 2045, RU 4), a fifth RU resource (AID 2045, RU 5), and a sixth RU resource (AID 2045, RU 6). Information about AID 0 or AID 2045 may be included, for example, in the user identifier field 1110 of FIG. 11. Information about RU 1 to RU 6 may be included, for example, in the RU allocation field 1120 of FIG. 11. AID=0 may indicate a UORA resource for an associated STA, and AID=2045 may indicate a UORA resource for an unassociated STA. Accordingly, the first to third RU resources of FIG. 19 may be used as UORA resources for an associated STA, and the fourth and fifth RU resources of FIG. 19 may be used as UORA resources for an unassociated STA. The sixth RU resource of FIG. 19 may be used as a resource for general UL MU.

In the example of FIG. 19, as an OFDMA random access backoff (OBO) counter for STA1 is decreased to 0, STA1 randomly selects the second RU resource (AID 0, RU 2). In addition, since an OBO counter for STA2/3 is greater than 0, no uplink resource is allocated to STA2/3. Further, in FIG. 19, since the AID (i.e., AID=3) of STA4 is included in the trigger frame, STA4 is allocated a resource of RU 6 without backoff.

Specifically, since STA1 of FIG. 19 is an associated STA, there are a total of three eligible RA RUs (RU 1, RU 2, and RU 3) for STA1, and accordingly STA1 decreases the OBO counter by 3 to 0. Since STA2 of FIG. 19 is an associated STA, there are a total of three eligible RA RUs (RU 1, RU 2, and RU 3) for STA2, and accordingly STA2 decreases the OBO counter by 3 but the OBO counter is greater than 0. Since STA3 of FIG. 19 is an unassociated STA, there are a total of two eligible RA RUs (RU 4 and RU 5) for STA3, and accordingly STA3 decreases the OBO counter by 2 but the OBO counter is greater than 0.

Referring to the example of FIG. 19, a legacy trigger frame indicates whether a particular random RU resource (i.e., a UORA RU) is allocated for an associated STA or for an unassociated STA. However, the legacy trigger frame does not include information about whether the particular random RU resource is for an STA performing an EDCA-disabling operation.

The present specification proposes an example of improving the legacy trigger frame. That is, as described above, it is preferable to guarantee an opportunity to use a random RU resource for a STA having an EDCA operation disabled. To this end, an AP may allocate a random RU resource that is available only for an EDCA-disabled STA.

A method of allocating a random RU resource for an EDCA-disabled STA may be determined variously.

First Example

As described above, when the user identifier field 1110 of FIG. 11 is set to a first value (i.e., 0), the subsequent RU allocation field 1120 may be used for a random RU resource for an associated STA; when the user identifier field 1110 of FIG. 11 is set to a second value (i.e., 2045), the subsequent RU allocation field 1120 may be used for a random RU resource for an unassociated STA. This specification proposes using the RU allocation field 1120 for a random RU resource for an EDCA-disabled STA when the user identifier field 1110 of FIG. 11 is set to a third value (e.g., 2044).

In this case, random RU resources (UORA RUs) may be classified into three types. That is, random resources (i.e., eligible RA RUs) used to decrease an OBO counter for a STA may be classified into three types. Specifically, the total number of RU allocation fields 1120 subsequent to a user identifier field 1110 set to the first value (i.e., AID=0) in one trigger frame may be used to decrease an OBO counter for an associated STA. Further, the total number of RU allocation fields 1120 subsequent to a user identifier field 1110 set to the second value (i.e., AID=2045) in one trigger frame may be used to decrease an OBO counter for an unassociated STA. In addition, the total number of RU allocation fields 1120 subsequent to a user identifier field 1110 set to the third value (i.e., AID=2044) in one trigger frame may be used to decrease an OBO counter for an EDCA-disabled STA.

The first example may be variously modified.

In the first example, EDCA-disabled STAs may use not only an RU allocation field (i.e., an RU allocated in a trigger frame set to AID=2044) subsequent to a user identifier field set to the third value (e.g., 2044) but also an RU allocation field (i.e., an RU allocated in a trigger frame set to AID=0 or AID=2045) subsequent to a user identifier field set to the first or second value (e.g., 0 or 2045) according to the connection state thereof.

For example, EDCA-disabled STAs related to an AP may perform a UORA procedure using both RUs allocated in a trigger frame with an AID set to 2044 and RUs allocated in a trigger frame with an AID set to 0. Unassociated EDCA-disabled STAs may perform a UORA procedure using both RUs allocated in a trigger frame with an AID set to 2044 and RUs allocated in a trigger frame with an AID set to 2045.

Second Example

This specification proposes an additional example of allocating a random RU resource for an EDCA-disabled STA.

FIG. 20 illustrates an example of additional information included in a user info field of a trigger frame. That is, FIG. 20 illustrates an example of control information included in the user info field (e.g., 960 #1 to 906 #N of FIG. 9) of the trigger frame. Specifically, a field illustrated in FIG. 20 is information included in the user info field of the trigger frame when the user identifier field 1110 of FIG. 11 is set to 0 or 2045. More specifically, a number of RA-RU field of FIG. 20 indicates the number of consecutive RUs allocated for UORA. For example, the value of the number of RA-RU field of FIG. 20 may be the number of consecutive RUs minus 1. A more RA-RU field of FIG. 20 may include information about whether a random RU resource is allocated in a next trigger frame.

This specification proposes an additional example of allocating a random RU resource for an EDCA-disabled STA by changing the fields of FIG. 20.

FIG. 21 illustrates an example of control information according to an example of the present specification.

As illustrated in FIG. 21, when a newly proposed restricted RA RU field is set to a specific value (e.g., 1), random RUs allocated by a user info field (e.g., 960 #1 to 906 #N in FIG. 9) of a trigger frame may be used only for an ECDA-disabled STA.

A method of determining a random resource (i.e., an eligible RA RU) used to decrease an OBO counter for a STA in the second example may be the same as that illustrated in the first example.

The second example may be variously modified.

In the second example, when the restricted RA RU field is set to a specific value (e.g., 1), EDCA-disabled STAs using the allocated random RUs may be restricted by an AID value. For example, when the AID is the first value (e.g., 0), only associated EDCA-disabled STAs use the allocated random RUs; when the AID is the second value (e.g., 2045), only unassociated EDCA-disabled STAs use the allocated random RUs. Alternatively, the associated EDCA-disabled STAs may perform a UORA operation using not only random RUs allocated in a trigger frame having an AID of the first value (e.g., 0) and a restricted RA RU field set to a specific value (e.g., 1) but also random RUs allocated in a trigger frame having an AID of the first value (e.g., 0) and a restricted RA RU field set to 0, and the unassociated EDCA-disabled STAs may perform a UORA operation using not only random RUs allocated in a trigger frame having an AID of 2045 and a restricted RA RU field set to a specific value (e.g., 1) but also random RUs allocated in a trigger frame having an AID of 2045 and a restricted RA RU field set to 0.

Figure 22:
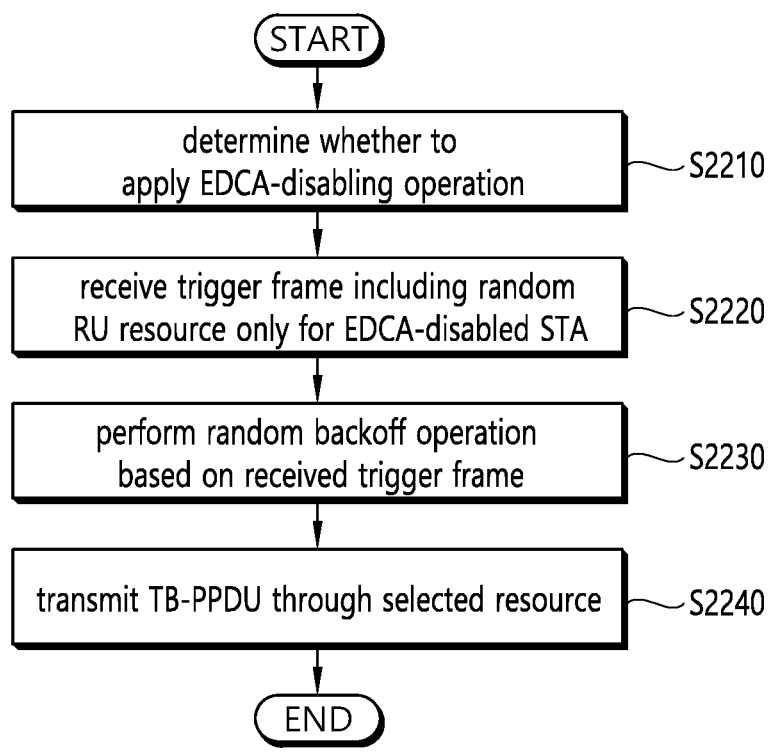
FIG. 22 illustrates an operation according to a modified example of the present specification.

FIG. 22 illustrates an operation according to a modified example of the present specification.

For example, in S2210, it may be determined whether to apply an EDCA-disabling operation to a STA. S2210 may be performed through all or some of S1610 to S1640 of FIG. 16 or may be performed through all or some of S1810 to S1840 of FIG. 18.

In S2220, the STA may receive a trigger frame including a random RU resource only for an EDCA-disabled STA from an AP. The first example or the second example described above may be used as a method for including the random RU resource only for the EDCA-disabled STA.

In S2230, the STA may perform a random backoff operation based on the received trigger frame. When the random RU resource only for the EDCA-disabled STA is included according to the foregoing first/second example, the STA may perform the backoff operation by reducing an OBO counter by the number of random RU resources included in the received trigger frame (the number of random RU resources only for the EDCA-disabled STA). When the OBO counter is 0, the STA may configure a TB PPDU based on one of the random RU resources only for the EDCA-disabled STA. In this case, BSR information about the STA may be included in the TB PPDU.

In S2240, the STA may transmit the TB PPDU through a selected resource. The STA may transmit the TB PPDU through the RU resource determined through S2230.

FIG. 23 illustrates an example of a PPDU to which an example of the present specification is applied.

The examples illustrated above in FIG. 16/FIG. 18/FIG. 22 may be performed based on a PPDU illustrated in FIG. 23. That is, each step may be performed through a PPDU according to an EHT standard (or different WLAN standard). The PPDU illustrated in FIG. 23 may include features of some of the foregoing HE-PPDU formats.

All or some of illustrated parts (i.e., fields) may be divided into a plurality of subparts/subfields. Each field (and subfields thereof) may be transmitted in a unit of 4 us*N (N is an integer). Further, each field may include a guard interval (or short GI) according to a conventional Wi-Fi standard. A common subcarrier frequency spacing value (delta_f=312.5 kHz/N or 312.5 kHz*N, N=integer) may be applied to all of the illustrated fields, or first delta_f may be applied to a first part (e.g., the entirety of a legacy part and the entirety/part of a SIG part) and second delta_f (e.g., smaller than first delta_f) may be applied to the entirety/part of the remaining part.

Some of the illustrated fields may be omitted, and the order of the fields is for illustration and may thus be changed in various ways. For example, a subfield (e.g., EHT-SIG-A and/or HARQ-SIG) of an EHT SIG part 2320 may be disposed before an EHT STF part 2330, and a remaining subfield (e.g., EHT-SIG-B/C or HARQ-SIG) of the EHT SIG part 2320 may be disposed after the EHT STF part 2330.

A legacy part 2310 of FIG. 23 may include at least one of a non-HT short training field (L-STF), a non-HT long training field (L-LTF), and a non-HT signal field (L-SIG). The EHT SIG part 2320 of FIG. 23 may include various pieces of control information for a PPDU to be transmitted. For example, the EHT SIG part 2320 may include control information for decoding the EHT STF part 2330, an EHT LTF part 2340, and data 2350. For example, HE-SIG-A information described above may be included in an EHT-SIG-A field, and HE-SIG-B information described above may be included in an EHT-SIG-B field. The EHT STF part 2330 of FIG. 23 may include a training field (i.e., an STF sequence). The STF sequence presented in this specification may reduce a PAPR. In addition, the STF sequence may help a receiving STA in configuring an AGC gain through a repeated pattern. The EHT LTF part 2340 of FIG. 23 may include a training field (i.e., an LTF sequence) for channel estimation.

The data field 2350 of FIG. 23 may include an MPDU or AMPDU. The aforementioned OM control field of FIG. 17 may be included in a MAC header of the data field of FIG. 23, and information about EDCA disabling disclosed in FIG. 16/FIG. 18/FIG. 22 may be included in the data field of FIG. 23.

Figure 24:
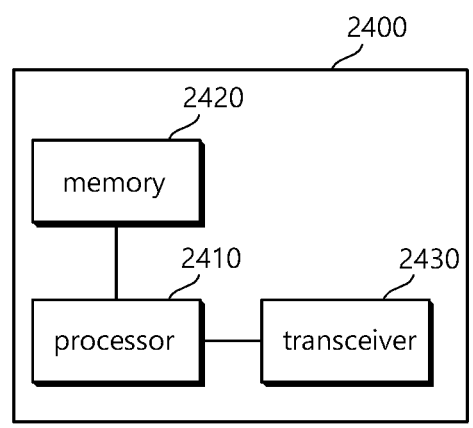
FIG. 24 illustrates an example of a STA to which an example of the present specification is applied.

FIG. 24 illustrates an example of a STA to which an example of the present specification is applied.

Referring to FIG. 24, the STA 2400 may include a processor 2410, a memory 2420, and a transceiver 2430. Characteristics of FIG. 24 may be applied to a non-AP or an AP STA. The processor, the memory, and the transceiver may be configured as separate chips, or at least two blocks/functions may be configured through one chip.

The transceiver 2430 transmits and receives a signal. Specifically, the transceiver 2430 may transmit and receive an IEEE 802.11 packet (e.g., IEEE 802.11a/b/g/n/ac/ax/be packets and the like).

The processor 2410 may implement the functions, processes, and/or methods proposed herein. Specifically, the processor 2410 may receive a signal through the transceiver 2430, may process a reception signal, may generate a transmission signal, and may perform control for signal transmission.

The processor 2410 may include an application-specific integrated circuit (ASIC), a separate chipset, a logic circuit, and a data processor. The memory 2420 may include a read-only memory (ROM), a random access memory (RAM), a flash memory, a memory card, a storage medium, and/or other storage devices.

The memory 2420 may store a signal received through the transceiver (i.e., a reception signal) and a signal to be transmitted through the transceiver (i.e., a transmission signal). That is, the processor 2410 may obtain a received signal through the memory 2420 and may store a signal to be transmitted in the memory 2420.

Figure 25:
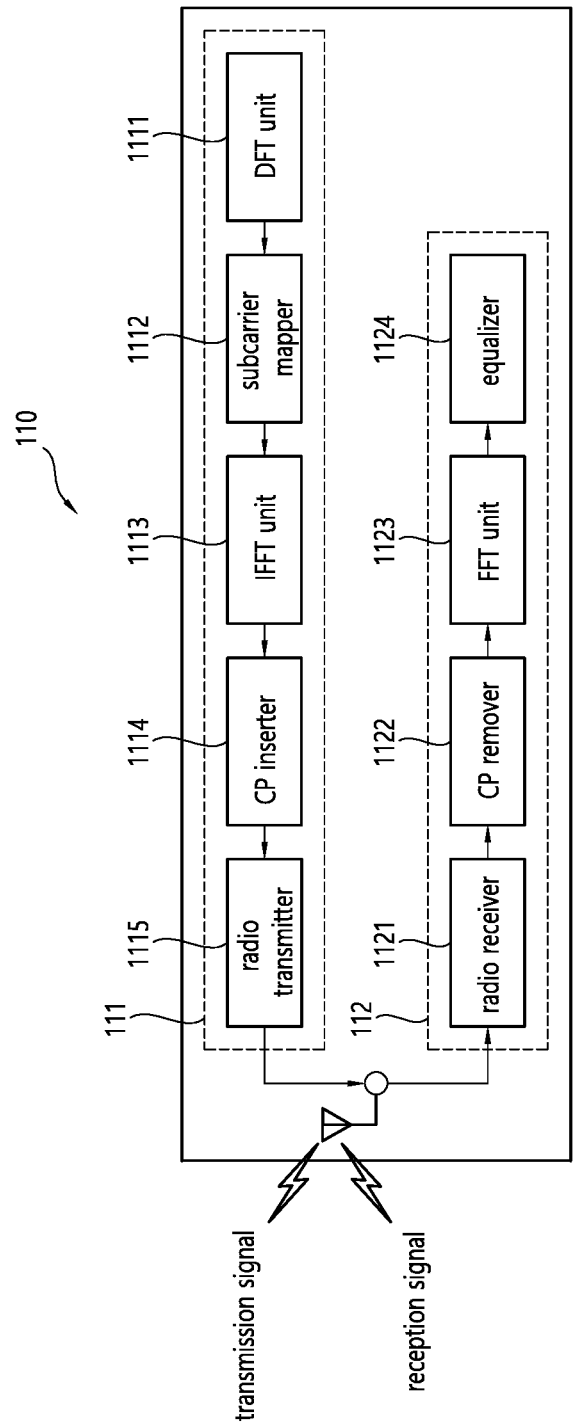
FIG. 25 is a block diagram specifically illustrating a transceiver.

FIG. 25 is a block diagram specifically illustrating a transceiver. Some or all blocks illustrated in FIG. 25 may be included in the processor 2410. Referring to FIG. 25, the transceiver 110 includes a transmitter 111 and a receiver 112. The transmitter 111 includes a discrete Fourier transform (DFT) unit 1111, a subcarrier mapper 1112, an IFFT unit 1113, a CP inserter 1114, a radio transmitter 1115. The transmitter 111 may further include a modulator. Also, for example, the transmitter 111 may further include a scramble unit (not shown), a modulation mapper (not shown), a layer mapper (not shown), and a layer permutator (not shown), and these elements may be positioned before the DFT unit 1111. That is, in order to prevent an increase in the peak-to-average power ratio (PAPR), the transmitter 111 allows information to pass through the DFT unit 1111 before mapping a signal to a subcarrier. After performing subcarrier mapping of a signal, which is spread (or precoded, in the same sense) by the DFT unit 1111, through the subcarrier mapper 1112, the signal passes through the inverse fast Fourier transform (IFFT) unit 1113 into a signal on a time axis.

The DFT unit 1111 performs DFT on inputted symbols, thereby outputting complex-valued symbols. For example, when Ntx symbols are inputted (where Ntx is a natural number), a DFT size is equal to Ntx. The DFT unit 1111 may also be referred to as a transform precoder. The subcarrier mapper 1112 maps the complex-valued symbols to each subcarrier in the frequency domain. The complex-valued symbols may be mapped to resource elements corresponding to a resource block being assigned for data transmission. The subcarrier mapper 1112 may also be referred to as a resource element mapper. The IFFT unit 1113 performs IFFT on the inputted symbols, thereby outputting a baseband signal for data, which corresponds to a time-domain signal. The CP inserter 1114 duplicates an end part of the baseband signal for the data and inserts the duplicated part to a front part of the baseband signal for the data. By performing CP insertion, inter-symbol interference (ISI) and inter-carrier interference (ICI) may be prevented, thereby allowing orthogonality to be maintained even in a multi-path channel.

The receiver 112 includes a radio receiver 1121, a CP remover 1122, an FFT unit 1123, and an equalizer 1124. The radio receiver 1121, the CP remover 1122, and the FFT unit 1123 of the receiver 112 respectively perform the inverse functions of the radio transmitter 1115, the CP inserter 1114, and the IFFT unit 1113 of the transmitter 111. The receiver 112 may further include a demodulator.

The transceiver of FIG. 25 may include a reception window controller (not shown) to extract part of a reception signal and a decoding processor (not shown) to decode a signal extracted through a reception window in addition to the illustrated blocks.

What is claimed is:

1. A method for a wireless local area network (WLAN) system, the method comprising:
   receiving, by a station (STA) from an access point (AP), a downlink (DL) physical protocol data unit (PPDU) including first control information related to a received signal strength indication (RSSI) threshold;
   determining, by the STA, whether to disable an enhanced distributed channel access (EDCA) operation of the STA based on the first control information; and
   transmitting, by the STA to the AP, an uplink (UL) PPDU including an operating mode (OM) control field,
   wherein the OM control field includes:
      a first sub-field having a length of 3 bits related to a number of reception (RX) spatial streams (SSs) of the STA,
      a second sub-field having a length of 2 bits related to a channel bandwidth of the STA,
      a third sub-field having a length of 1 bit related to whether to disable an uplink multi-user (UL MU) transmission of the STA,
      a fourth sub-field having a length of 3 bits related to a number of transmission (TX) SSs of the STA,
      a fifth sub-field having a length of 1 bit related to whether to disable an extended range single-user (ER SU) transmission of the STA, and
      a sixth sub-field having a length of 1 bit related to disabling the EDCA operation of the STA,
      wherein the first sub-field is contiguous to the second sub-field being contiguous to the third sub-field being contiguous to the fourth sub-field being contiguous to the fifth sub-field being contiguous to the sixth sub-field; and
   receiving, by the STA from the AP, a trigger frame soliciting a trigger-based (TB) PPDU transmission of the STA,
   wherein the trigger frame includes allocation information related to a resource unit (RU) allocated to the STA, wherein the RU has a size of 26 sub-carriers or 52 sub-carriers.

2. The method of claim 1, wherein the first control information further includes:
   a threshold value of a downlink received signal strength indication (DL RSSI), a threshold value of a DL signal-to-noise ratio (SNR), and/or a threshold value of an uplink (UL) power headroom for the STA.

3. The method of claim 1, wherein the OM control field is included in a MAC protocol data unit (MPDU) of the UL PPDU transmitted to the AP.

4. A station (STA) in a wireless local area network (WLAN) system, the STA comprising:
   a memory to store a transmission signal and a reception signal; and
   a processor connected to the memory,
   wherein the processor is configured to:
   receive, from an access point (AP), a downlink (DL) physical protocol data unit (PPDU) including first control information related to a received signal strength indication (RSSI) threshold;
   determine whether to disable an enhanced distributed channel access (EDCA) operation of the STA based on the first control information; and
   transmit, to the AP, an uplink (UL) PPDU including an operating mode (OM) control field,
   wherein the OM control field includes:
      a first sub-field having a length of 3 bits related to a number of reception (RX) spatial streams (SSs) of the STA,
      a second sub-field having a length of 2 bits related to a channel bandwidth of the STA,
      a third sub-field having a length of 1 bit related to whether to disable an uplink multi-user (UL MU) transmission of the STA,
      a fourth sub-field having a length of 3 bits related to a number of transmission (TX) SSs of the STA,
      a fifth sub-field having a length of 1 bit related to whether to disable an extended range single-user (ER SU) transmission of the STA, and
      a sixth sub-field having a length of 1 bit related to disabling the EDCA operation of the STA,
      wherein the first sub-field is contiguous to the second sub-field being contiguous to the third sub-field being contiguous to the fourth sub-field being contiguous to the fifth sub-field being contiguous to the sixth sub-field; and
   receiving, from the AP, a trigger frame soliciting a trigger-based (TB) PPDU transmission of the STA,
   wherein the trigger frame includes allocation information related to a resource unit (RU) allocated to the STA, wherein the RU has a size of 26 sub-carriers or 52 sub-carriers.

5. The STA of claim 4, wherein the first control information further includes:
   a threshold value of a downlink received signal strength indication (DL RSSI), a threshold value of a DL signal-to-noise ratio (SNR), and/or a threshold value of an uplink (UL) power headroom for the STA.

6. The STA of claim 4, wherein the OM control field is included in a MAC protocol data unit (MPDU) of the UL PPDU transmitted to the AP.

* * * * *